(12) United States Patent
Damnjanovic et al.

(10) Patent No.: US 10,142,984 B2
(45) Date of Patent: *Nov. 27, 2018

(54) METHODS AND APPARATUS FOR SUBFRAME INTERLACING IN HETEROGENEOUS NETWORKS

(71) Applicant: QUALCOMM Incorporated, San Diego, CA (US)

(72) Inventors: Aleksandar Damnjanovic, Del Mar, CA (US); Yongbin Wei, La Jolla, CA (US); Peter A. Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 14/978,547

(22) Filed: Dec. 22, 2015

(65) Prior Publication Data

US 2016/0198462 A1 Jul. 7, 2016

Related U.S. Application Data

(63) Continuation of application No. 14/169,142, filed on Jan. 30, 2014, now Pat. No. 9,281,932, which is a
(Continued)

(51) Int. Cl.
*H04W 72/04* (2009.01)
*H04W 16/10* (2009.01)
(Continued)

(52) U.S. Cl.
CPC ..... *H04W 72/0446* (2013.01); *H04J 11/0079* (2013.01); *H04L 5/0057* (2013.01);
(Continued)

(58) Field of Classification Search
CPC .... H04L 5/0092; H04W 16/10; H04W 16/14; H04W 72/04
See application file for complete search history.

(56) References Cited

U.S. PATENT DOCUMENTS

| 4,857,863 A | 8/1989 | Ganger et al. |
| 5,051,625 A | 9/1991 | Ikeda et al. |

(Continued)

FOREIGN PATENT DOCUMENTS

| CN | 1311968 A | 9/2001 |
| CN | 1956567 A | 5/2007 |

(Continued)

OTHER PUBLICATIONS

US 8,583,133, 11/2013, Ji et al. (withdrawn)
(Continued)

*Primary Examiner* — Rina C Pancholi
(74) *Attorney, Agent, or Firm* — Holland & Hart LLP/Qualcomm

(57) ABSTRACT

Methods and apparatus for providing wireless communications using subframe partitioning are disclosed. Two or more base stations may be allocated subframes in a radio frame. All or part of the subframe allocation may be provided to the associated user equipment (UEs), which may use it to determine signal metrics during assigned subframes for an associated base station.

23 Claims, 26 Drawing Sheets

Related U.S. Application Data continuation of application No. 12/882,090, filed on Sep. 14, 2010, now Pat. No. 8,942,192.

(60) Provisional application No. 61/242,678, filed on Sep. 15, 2009.

(51) Int. Cl.
   *H04L 5/00* (2006.01)
   *H04J 11/00* (2006.01)
   *H04W 16/14* (2009.01)

(52) U.S. Cl.
   CPC .......... *H04L 5/0092* (2013.01); *H04W 16/10* (2013.01); *H04W 72/04* (2013.01); *H04J 2211/005* (2013.01); *H04W 16/14* (2013.01)

(56) References Cited

U.S. PATENT DOCUMENTS

| | | |
|---|---|---|
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 5,991,279 A * | 11/1999 | Haugli ............ H04B 7/18513 340/7.34 |
| 6,040,744 A | 3/2000 | Sakurai et al. |
| 6,147,550 A | 11/2000 | Holloway |
| 6,151,492 A | 11/2000 | Melin |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Oestberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2 | 4/2012 | Chun et al. |
| 8,174,995 B2 | 5/2012 | Malladi et al. |
| 8,228,827 B2 | 7/2012 | Jeong et al. |
| 8,363,697 B2 | 1/2013 | Grob et al. |
| 8,446,869 B2 | 5/2013 | Lee et al. |
| 8,638,131 B2 | 1/2014 | Chen et al. |
| 8,724,563 B2 | 5/2014 | Yoo et al. |
| 8,886,190 B2 | 11/2014 | Damnjanovic et al. |
| 8,942,192 B2 | 1/2015 | Damnjanovic et al. |
| 2002/0028675 A1 * | 3/2002 | Schmutz ............ H04B 7/2606 455/424 |
| 2003/0043928 A1 | 3/2003 | Ling et al. |
| 2005/0064873 A1 | 3/2005 | Karaoguz et al. |
| 2005/0096061 A1 | 5/2005 | Ji et al. |
| 2005/0254555 A1 | 11/2005 | Teague et al. |
| 2005/0260990 A1 | 11/2005 | Huang et al. |
| 2006/0098604 A1 | 5/2006 | Flammer, III et al. |
| 2006/0166693 A1 | 7/2006 | Jeong et al. |
| 2007/0064669 A1 | 3/2007 | Classon et al. |
| 2007/0087691 A1 | 4/2007 | Lee et al. |
| 2007/0104166 A1 | 5/2007 | Rahman et al. |
| 2007/0153719 A1 | 7/2007 | Gopal |
| 2007/0167181 A1 | 7/2007 | Ramesh et al. |
| 2007/0242763 A1 | 10/2007 | Li et al. |
| 2007/0253355 A1 | 11/2007 | Hande et al. |
| 2008/0008212 A1 | 1/2008 | Wang et al. |
| 2008/0013500 A1 | 1/2008 | Laroia et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130586 A1 | 6/2008 | Johnson et al. |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0219236 A1 | 9/2008 | Love et al. |
| 2008/0220791 A1 | 9/2008 | Cho et al. |
| 2008/0227449 A1 | 9/2008 | Gholmieh et al. |
| 2008/0253300 A1 | 10/2008 | Wakabayashi et al. |
| 2008/0254804 A1 | 10/2008 | Lohr et al. |
| 2008/0260000 A1 | 10/2008 | Periyalwar et al. |
| 2008/0260062 A1 | 10/2008 | Imamura |
| 2008/0268859 A1 | 10/2008 | Lee et al. |
| 2008/0285513 A1 | 11/2008 | Jung et al. |
| 2009/0046605 A1 | 2/2009 | Gao et al. |
| 2009/0046674 A1 | 2/2009 | Gao et al. |
| 2009/0069023 A1 | 3/2009 | Ahn et al. |
| 2009/0088175 A1 | 4/2009 | Pelletier et al. |
| 2009/0103500 A1 | 4/2009 | Malkamaki et al. |
| 2009/0109915 A1 | 4/2009 | Pasad et al. |
| 2009/0131065 A1 | 5/2009 | Khandekar et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196249 A1 | 8/2009 | Kawamura et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0239590 A1 | 9/2009 | Parkvall |
| 2009/0252077 A1 | 10/2009 | Khandekar et al. |
| 2009/0257371 A1 * | 10/2009 | Nishio ................ H04L 5/0037 370/312 |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0298498 A1 | 12/2009 | Pisut et al. |
| 2009/0312024 A1 | 12/2009 | Chen et al. |
| 2009/0325626 A1 | 12/2009 | Palanki et al. |
| 2010/0008282 A1 | 1/2010 | Bhattad et al. |
| 2010/0022250 A1 | 1/2010 | Petrovic et al. |
| 2010/0029282 A1 | 2/2010 | Stamoulis et al. |
| 2010/0034135 A1 * | 2/2010 | Kim ................ H04B 7/2606 370/315 |
| 2010/0034158 A1 | 2/2010 | Meylan et al. |
| 2010/0035600 A1 | 2/2010 | Hou et al. |
| 2010/0067472 A1 | 3/2010 | Ball et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0128690 A1 | 5/2010 | McBeath et al. |
| 2010/0144317 A1 | 6/2010 | Jung et al. |
| 2010/0195582 A1 * | 8/2010 | Koskinen ............ H04L 5/0032 370/329 |
| 2010/0232373 A1 | 9/2010 | Nory et al. |
| 2010/0240386 A1 | 9/2010 | Hamabe et al. |
| 2010/0246521 A1 | 9/2010 | Zhang et al. |
| 2010/0254268 A1 | 10/2010 | Kim et al. |
| 2010/0254329 A1 | 10/2010 | Pan et al. |

(56) References Cited

U.S. PATENT DOCUMENTS

| | | |
|---|---|---|
| 2010/0254344 A1 | 10/2010 | Wei et al. |
| 2010/0260156 A1 | 10/2010 | Lee et al. |
| 2010/0265870 A1 | 10/2010 | Cai et al. |
| 2010/0271966 A1* | 10/2010 | Hirano ............... H04W 24/10 370/252 |
| 2010/0272059 A1 | 10/2010 | Bienas et al. |
| 2010/0290372 A1 | 11/2010 | Zhong et al. |
| 2010/0304665 A1* | 12/2010 | Higuchi ............ H04B 7/15535 455/7 |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0322180 A1 | 12/2010 | Kim et al. |
| 2010/0323611 A1 | 12/2010 | Choudhury |
| 2010/0331030 A1 | 12/2010 | Nory et al. |
| 2011/0007673 A1 | 1/2011 | Ahn et al. |
| 2011/0007699 A1* | 1/2011 | Moon ................... H04L 5/0053 370/329 |
| 2011/0013554 A1* | 1/2011 | Koskinen ............ H04L 5/0094 370/315 |
| 2011/0032890 A1 | 2/2011 | Wu |
| 2011/0038271 A1 | 2/2011 | Shin et al. |
| 2011/0044227 A1* | 2/2011 | Harrang ............... H04H 20/42 370/312 |
| 2011/0044261 A1 | 2/2011 | Cai et al. |
| 2011/0051684 A1 | 3/2011 | Li et al. |
| 2011/0053603 A1 | 3/2011 | Luo et al. |
| 2011/0064037 A1 | 3/2011 | Wei et al. |
| 2011/0081865 A1 | 4/2011 | Xiao et al. |
| 2011/0116364 A1 | 5/2011 | Zhang et al. |
| 2011/0116437 A1 | 5/2011 | Chen et al. |
| 2011/0134875 A1 | 6/2011 | Ding et al. |
| 2011/0149771 A1 | 6/2011 | Abeta et al. |
| 2011/0149813 A1 | 6/2011 | Parkvall et al. |
| 2011/0149903 A1* | 6/2011 | Krishnamurthy ..... H04L 5/0007 370/330 |
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0190024 A1 | 8/2011 | Seong et al. |
| 2011/0194514 A1 | 8/2011 | Lee et al. |
| 2011/0199986 A1 | 8/2011 | Fong et al. |
| 2011/0201279 A1 | 8/2011 | Suzuki et al. |
| 2011/0205982 A1 | 8/2011 | Yoo et al. |
| 2011/0211503 A1 | 9/2011 | Che et al. |
| 2011/0243075 A1 | 10/2011 | Luo et al. |
| 2011/0249643 A1 | 10/2011 | Barbieri et al. |
| 2011/0268032 A1 | 11/2011 | Kim et al. |
| 2011/0274066 A1 | 11/2011 | Tee et al. |
| 2011/0275394 A1 | 11/2011 | Song et al. |
| 2011/0310789 A1 | 12/2011 | Hu et al. |
| 2011/0310830 A1 | 12/2011 | Wu et al. |
| 2011/0317624 A1 | 12/2011 | Luo et al. |
| 2012/0026892 A1 | 2/2012 | Nakao et al. |
| 2012/0033588 A1 | 2/2012 | Chung et al. |
| 2012/0033633 A1 | 2/2012 | Li et al. |
| 2012/0033647 A1 | 2/2012 | Moon et al. |
| 2012/0039180 A1 | 2/2012 | Kim et al. |
| 2012/0039208 A1 | 2/2012 | Aydin |
| 2012/0087250 A1 | 4/2012 | Song et al. |
| 2012/0088516 A1 | 4/2012 | Ji et al. |
| 2012/0093095 A1 | 4/2012 | Barbieri et al. |
| 2012/0093097 A1 | 4/2012 | Che et al. |
| 2012/0106481 A1 | 5/2012 | Cho et al. |
| 2012/0108239 A1 | 5/2012 | Damnjanovic et al. |
| 2012/0108255 A1 | 5/2012 | Jo et al. |
| 2012/0155366 A1 | 6/2012 | Zirwas et al. |
| 2012/0182958 A1 | 7/2012 | Pelletier et al. |
| 2012/0212260 A1 | 8/2012 | Chen et al. |
| 2012/0236798 A1 | 9/2012 | Raaf et al. |
| 2012/0281656 A1 | 11/2012 | Hooli et al. |
| 2013/0005344 A1 | 1/2013 | Dimou et al. |
| 2013/0077543 A1 | 3/2013 | Kim et al. |
| 2013/0077576 A1 | 3/2013 | Abe et al. |
| 2013/0229933 A1 | 9/2013 | Ji et al. |
| 2013/0250927 A1 | 9/2013 | Song |
| 2014/0036838 A1 | 2/2014 | Yoo et al. |
| 2014/0146798 A1 | 5/2014 | Damnjanovic et al. |

FOREIGN PATENT DOCUMENTS

| | | | |
|---|---|---|---|
| CN | 1965513 A | 5/2007 | |
| CN | 1985447 A | 6/2007 | |
| CN | 101018220 A | 8/2007 | |
| CN | 101090281 A | 12/2007 | |
| CN | 101155399 A | 4/2008 | |
| CN | 101222726 A | 7/2008 | |
| CN | 101262680 A | 9/2008 | |
| CN | 101296459 A | 10/2008 | |
| CN | 101316267 A | 12/2008 | |
| CN | 101400130 A | 4/2009 | |
| CN | 101467382 A | 6/2009 | |
| CN | 101483511 A | 7/2009 | |
| CN | 101499882 A | 8/2009 | |
| CN | 101505498 A | 8/2009 | |
| CN | 101507220 A | 8/2009 | |
| CN | 101686580 A | 3/2010 | |
| EP | 1811711 A1 | 7/2007 | |
| EP | 2076066 | 7/2009 | |
| EP | 2120472 A1 | 11/2009 | |
| EP | 2744289 A2 | 6/2014 | |
| JP | H06350514 A | 12/1994 | |
| JP | 09501038 A | 1/1997 | |
| JP | 09327060 A | 12/1997 | |
| JP | H1118144 A | 1/1999 | |
| JP | 2001231077 A | 8/2001 | |
| JP | 2003506960 A | 2/2003 | |
| JP | 2005277570 A | 10/2005 | |
| JP | 2006345405 A | 12/2006 | |
| JP | 2007529915 A | 10/2007 | |
| JP | WO 2007129620 A1 * | 11/2007 | ............ H04L 5/0037 |
| JP | 2008017325 A | 1/2008 | |
| JP | 2008500764 A | 1/2008 | |
| JP | 2008500766 A | 1/2008 | |
| JP | 2008172357 A | 7/2008 | |
| JP | 2008301493 A | 12/2008 | |
| JP | 2009527939 A | 7/2009 | |
| JP | 2010506446 A | 2/2010 | |
| JP | 2010081446 A | 4/2010 | |
| JP | 2010516163 A | 5/2010 | |
| JP | 2010519784 A | 6/2010 | |
| JP | 2010536256 A | 11/2010 | |
| JP | 2010541492 A | 12/2010 | |
| JP | 2011505088 A | 2/2011 | |
| JP | 2011505091 A | 2/2011 | |
| JP | 2011507391 A | 3/2011 | |
| JP | 2011516000 A | 5/2011 | |
| JP | 2011521512 A | 7/2011 | |
| JP | 2013502841 A | 1/2013 | |
| KR | 20060119715 A | 11/2006 | |
| KR | 20100018453 A | 2/2010 | |
| RU | 2305902 C2 | 9/2007 | |
| RU | 2007105748 A | 8/2008 | |
| RU | 2343646 C2 | 1/2009 | |
| RU | 2369965 C2 | 10/2009 | |
| RU | 2528379 C2 | 9/2014 | |
| WO | 0111804 A1 | 2/2001 | |
| WO | 2004066104 | 8/2004 | |
| WO | 2004079949 A1 | 9/2004 | |
| WO | 2005019705 A1 | 3/2005 | |
| WO | 2005062798 A2 | 7/2005 | |
| WO | 05071867 | 8/2005 | |
| WO | 05109705 | 11/2005 | |
| WO | 2005117283 A2 | 12/2005 | |
| WO | 2005125053 A1 | 12/2005 | |
| WO | 2006020021 A1 | 2/2006 | |
| WO | 2006099546 A1 | 9/2006 | |
| WO | 2007080892 A1 | 7/2007 | |
| WO | 2007097671 A1 | 8/2007 | |
| WO | 2007097672 A1 | 8/2007 | |
| WO | 2007108630 A1 | 9/2007 | |
| WO | 07121386 | 10/2007 | |
| WO | 2007129537 A1 | 11/2007 | |

(56) References Cited

FOREIGN PATENT DOCUMENTS

| WO | 2007129620 A1 | 11/2007 |
|---|---|---|
| WO | 2008024751 A2 | 2/2008 |
| WO | 2008040448 A1 | 4/2008 |
| WO | 2008041819 A1 | 4/2008 |
| WO | 2008057969 A2 | 5/2008 |
| WO | 08086517 | 7/2008 |
| WO | 2008081816 A1 | 7/2008 |
| WO | 2008093985 A1 | 8/2008 |
| WO | 2008116128 A2 | 9/2008 |
| WO | 2009011059 A1 | 1/2009 |
| WO | 2009016260 A1 | 2/2009 |
| WO | 2009020926 A1 | 2/2009 |
| WO | 2009022295 | 2/2009 |
| WO | 2009038367 A1 | 3/2009 |
| WO | 2009043002 | 4/2009 |
| WO | 2009046061 A2 | 4/2009 |
| WO | 2009048246 A2 | 4/2009 |
| WO | 2009062115 A2 | 5/2009 |
| WO | 2009064147 A2 | 5/2009 |
| WO | 2009065075 A1 | 5/2009 |
| WO | 2009067842 A1 | 6/2009 |
| WO | 2009071583 A1 | 6/2009 |
| WO | 2009076803 A1 | 6/2009 |
| WO | 2009078795 A1 | 6/2009 |
| WO | 2009088251 A2 | 7/2009 |
| WO | 2009089798 A1 | 7/2009 |
| WO | WO-2009093406 A1 | 7/2009 |
| WO | 2009096846 A1 | 8/2009 |
| WO | 2009126586 A2 | 10/2009 |
| WO | 2009152866 A1 | 12/2009 |
| WO | 2010006285 A2 | 1/2010 |
| WO | 2010016607 A1 | 2/2010 |
| WO | 2010016726 A2 | 2/2010 |
| WO | 2010032791 A1 | 3/2010 |
| WO | 2010033957 A2 | 3/2010 |
| WO | 2010039738 | 4/2010 |
| WO | 2010044903 A2 | 4/2010 |
| WO | 2010110840 A2 | 9/2010 |
| WO | 2011034966 A1 | 3/2011 |
| WO | 2011130447 A1 | 10/2011 |

OTHER PUBLICATIONS

International Search Report and Written Opinion—PCT/US2010/048988—International Search Authority, European Patent Office,dated Feb. 4, 2011.
International Search Report and Written Opinion—PCT/US2011/032367—ISA/EPO—dated Jul. 27, 2011.
International Search Report and Written Opinion—PCT/US2011/032370—ISA EPO—dated Aug. 9, 2011.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol. RAN WGI, No. San Francisco, USA; Feb. 22, 2010-Feb. 26, 2010, Feb. 16, 2010 (Feb. 16, 2010), XP050418854, pp. 1-5.
LG Electronics: Coordination for DL Control Channel in Co-Channel CSG Deployment, 3GPP TSG RAN WG1 Meeting #61, R1-102704, 2010, 8 Pages.
LG Electronics: "Coordination for DL control channel in co-channel HeNB deployment", 3GPP Draft; R1-102429 Control Channel in HETNET, 3rd Generation Partnership Project (3GPP), Mobile Competence Centre ; 650, Route Des Luvioles ; F-06921 Sophia-Antipolis Cedex ; France, vol. RAN WG1, No. Beijing, china; Apr. 12, 2010, Apr. 6, 2010 (Apr. 6, 2010), XP050419640, [retrieved on Apr. 6, 2010].
LG Electronics Inc: "MAC Random Access Response Extension" 3GPP Draft; R2-085237 MAC RAR Extension, 3rd Generation Partnership Project (3GPP), Mobile Competence Centre ; 650, Route Des Luvioles ; F-06921 Sophia-Antipolis Cedex ; France, No. Prague, Czech Republic; Sep. 23, 2008, Sep. 23, 2008 (Sep. 23, 2008), XP050320136, [retrieved on Sep. 23, 2008] the whole document.
LG-Nortel: "Interference under Type 1 RN", 3GPP TSG-RAN WG1#57, R1-092184, 14 pages, May 4, 2009.
Lopez-Perez D., et al., "OFDMA femtocells: A roadmap on interference avoidance", IEEE Communications Magazine, IEEE Service Center, Piscataway, US, vol. 47, No. 9, Sep. 1, 2009 (Sep. 1, 2009), pp. 41-48, XP011283364, ISSN: 0163-6804, DOI: 10.1109/MCOM.2009.5277454.
Motorola: "DCI Format 1C with implicit RV and TBS," 3GPP TSG RAN1 #54, Aug. 18, 2008, R1-083207, 5 pages.
Motorola: "HeNB Interference Management", 3GPP TSG-RAN WG1#60 R1-101121, , Feb. 17, 2010, 4 Pages.
Nortel: "Discussions on LTE mobility performance evaluation", 3GPP TSG-RAN WG1#57 R1-091913, , May 9, 2009, 3 Pages.
NTT Docomo: "Downlink Interference Coordination Between eNodeB and Home eNodeB", 36PP Draft; R1-101225 HENB_ICIC, 3rd Generation Partnership Project (3GPP), Mobile Competence Centre ; 650, Route Des Luvioles ; F-06921 Sophia-Antipolis Cedex ; France, vol. RAN WGI, No. San Francisco, USA; Feb. 22, 2010, Feb. 16, 2010 (Feb. 16, 2010), XP050418740, [retrieved on Feb. 16, 2010]., p. 1-8.
NTT Docomo: "Interference Coordination for Non-CA-based Heterogeneous Networks", 3GPP Draft; R1-102307 ICIC for Non-CA HetNet, 3rd Generation Partnership Project (3GPP), Mobile Competence Centre; 650, Route Des Luvioles; F-06921 Sophia-Antipolis Cedex; France, vol. RAN WG1, No. Beijing, china; Apr. 12, 2010, Apr. 7, 2010 (Apr. 7, 2010), pp. 1-11, XP050419698, [retrieved on Apr. 7, 2010].
NTT Docomo, "Performance Evaluations of Heterogeneous Networks", 3GPP TSG RAN WG1 Meeting #60, R1-101226, Feb. 26, 2010, pp. 1-18.
Panasonic: "PDCCH with cross component carrier assignment", 3GPP Draft; R1-093597(Update of R1-093464), 3rd Generation Partnership Project (3GPP), Mobile Competence Centre ; 650, Route Des Luvioles ; F-06921 Sophia-Antipolis Cedex ; France, No. Shenzhen, China; Aug. 24, 2009, Aug. 24, 2009 (Aug. 24, 2009), XP050388168, [retrieved on Aug. 24, 2009].
Partial International Search Report—PCT/US2010/038212—International Search Authority, European Patent Office, dated Nov. 4, 2010.
Partial International Search Report—PCT/US2010/038884—International Search Authority, European Patent Office,dated Oct. 22, 2010.
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Luvioles ; F-06921 Sophia-Antipolis Cedex ; France, No. Shenzhen, China; Aug. 18, 2009, Aug. 18, 2009 (Aug. 18, 2009), XP050351718 [retrieved on Aug. 18, 2009] p. 1, paragraph 1-paragraph 2.
Qualcomm Europe: "Carrier Aggregation in Heterogeneous Networks", 3GPP Draft; R1-092239, 3rd Generation Partnership Project (3GPP), Mobile Competence Centre; 650, Route Des Luvioles; F-06921 Sophia-Antipolis Cedex; France, No. San Francisco, USA; May 8, 2009, May 8, 2009 (May 8, 2009), XP050339658, [retrieved on May 8, 2009].
Qualcomm Europe, "Carrier Aggregation in Heterogeneous Networks", 3GPP TSG RAN WG1 #56bis, R1-091459, pp. 1-12, Seoul, Korea, Mar. 23-27, 2009.
Qualcomm Europe: "Coordinated Multi-Point downlink transmission in LTE-Advanced" 3GPP Draft; R1-084400 Comp, 3rd Generation Partnership Project (3GPP), Mobile Competence Centre; 650, Route Des Luvioles ; F-06921 Sophia-Antipolis Cedex; France, No. Prague, Czech Republic; Nov. 5, 2008, Nov. 5, 2008 (Nov. 5, 2008), XP050317663.
Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip.

(56) References Cited

OTHER PUBLICATIONS

Qualcomm Inc., "Introduction of time domain ICIC", R2-106943, 3GPP TSG-RAN WG2 Meeting #72, Jacksonville, US, Nov. 15-19, 2010, pp. 4.
Qualcomm Inc., "RRM/RLM resource restriction for time domain ICIC", R2-110698, 3GPP TSG-RAN WG2 Meeting #72-bis, Dublin, Ireland, Jan. 17-21, 2011, pp. 8.
Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre ; 650, Route des Lucioles ; F-06921 Sophia-Antipolis Cedex ; France, vol. RAN WG1, No. San Francisco, USA; Feb. 22, 2010, Feb. 16, 2010 (Feb. 16, 2010), pp. 1-4, XP050418951, [retrieved on Feb. 16, 2010].
Qualcomm Incorporated: "Measurements and feedback extensions for improved operations in HetNets", 3GPP TSG-RAN WG1#60b R1-102353, , Apr. 6, 2010, 3 Pages.
Samsung: "Clarification on the parallel receptions for PDSCHs", 3GPP Draft; 36302_CR0010 (Rel-8) R2-093579, 3rd Generation Partnership Project (3GPP), Mobile Competence Centre ; 650, Route Des Lucioles ; F-06921 Sophia-Antipolis Cedex ; France, No. San Francisco, USA; May 19, 2009, May 19, 2009 (May 19, 2009), pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, No. Shenzhen, China; Aug. 19, 2009, Aug. 19, 2009 (Aug. 19, 2009), XP050351683 [retrieved on Aug. 19, 2009] p. 1, paragraph 1.
Samsung: "Inbound mobility to H(e)NBs" 3GPP Draft; R2-093250_Inb0und Mobility to H(E)NBS-R4, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, Apr. 28, 2009 (Apr. 28, 2009), XP050340933 [retrieved on Apr. 28, 2009] the whole document.
Sang Y J., et al., "A Self-Organized Femtocell for IEEE 802.16e System", Global Telecommunications Conference, 2009. Globecom 2009. IEEE, IEEE, Piscataway, NJ, USA, Nov. 30, 2009 (Nov. 30, 2009), pp. 1-5, XP031646102, ISBN: 978-1-4244-4148-8.
Taiwan Search Report—TW099118958—TIPO—dated May 29, 2013.
Taiwan Search Report—TW099119809—TIPO—dated May 24, 2013.
Taiwan Search Report—TW099126793—TIPO—dated May 24, 2013.
Taiwan Search Report—TW099128308—TIPO—dated Jun. 7, 2013.
Taiwan Search Report—TW099131096—TIPO—dated Mar. 31, 2014.
Taiwan Search Report—TW099131274—TIPO—dated Jul. 19, 2013.
Taiwan Search Report—TW100112865—TIPO—dated Jan. 3, 2014.
Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, No. Ljubljana, Jan. 7, 2009, Jan. 7, 2009 (Jan. 7, 2009), XP050318205, pp. 1-5, [retrieved on Jan. 7, 2009].
TSG-RAN WG4: "Reply to LS on mobility evaluation" 3GPP TSG-RAN WG4;50bis R4-091518, , Mar. 30, 2009, 3 Pages.
Vice Chairman: "Report of E-UTRA control plane session" 3GPP Draft; R2-082841-Chair-Report-RAN2-62-LTE-CP, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; May 14, 2008, May 14, 2008 (May 14, 2008), XP050140403 [retrieved on May 14, 2008].
Written Opinion—PCT/US2011/041643, ISA/EPO—Oct. 18, 2011.
ZTE: "Scenarios and Specification Impact of Type 2 Relay", 3GPP TSG-RAN WG1#60 R1-100979, , Feb. 16, 2010, 7 Pages.
Ericsson: "Idle Subframes for TDD", R1-073040, 3GPP, Jun. 20, 2007, 2 Pages.

NTT Docomo Inc: "Inter-Cell Radio Resource Management for Heterogeneous Network", R1-082576, 3GPP, Jun. 28, 2008, 19 Pages.
NTT Docomo Inc: "Inter-Cell Radio Resource Management for Heterogeneous Network", R1-083019, 3GPP, Aug. 12, 2008, 20 Pages.
NTT Docomo Inc: "Inter-Cell Radio Resource Management for Heterogeneous Network", R1-083687, 3GPP, Sep. 24, 2008, 21 Pages.
Qualcomm Europe: "Heterogeneous Deployment Studies for LTE-Advanced", R1-093140, 3GPP, Aug. 19, 2009, pp. 1-3.
3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2009) Technical Specification, No. V8.7.0, Jun. 8, 2009 (Jun. 8, 2009), pp. 1-77, XP002602609.
3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009 (Mar. 1, 2009), pp. 1-17, XP050377589.
3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre ; 650, Route Des Lucioles ; F-06921 Sophia-Antipolis Cedex ; France, No. San Francisco, USA; May 9, 2009, May 9, 2009 (May 9, 2009), pp. 1-34, XP050339706, [retrieved on May 9, 2009].
3GPP: "LS on RV Determination for BCCH," 3GPP TSG RAN WG1 Meeting #54bis, Sep. 29, 2008, R1-084067.
3GPP TS 36.331 V8.5.0, Radio Resource Control (RRC); Protocol specification (Release 8), 204 pages, 2009.
3GPP TS 36.355 V9.0.0, Technical Specification Group Radio Access Network, E-UTRA, "LTE Positioning Protocal (LLP) (Release 9)" Dec. 2009, 31 pages.
3GPP TSG RAN WG2 #62bis, Ericsson, E-UTRA UE Radio Measurement Reporting for Uplink ICIC, R2-083147, Jul. 2008, http://www.3gpp.org/FTP/tsg_ran/WG2_RL2/TSGR2_62bis/Docs/R2-083147.zip.
3GPP TSG-RAN WG2 Meeting #68 R2-096531, "Email discussion on MBMS value range [67b#14]", Nov. 9-13, 2009, Jeju, Korea, Discussion and Decision, , p. 1-13.
3RD Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0,, [Online] vol. 36.321, No. V8.5.0, Mar. 1, 2009 (Mar. 1, 2009), pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP Standard; 3GPP TS 36.300, 3rd Generation Partnership Project (3GPP), Mobile Competence Centre; 650, Route Des Lucioles; F-06921 Sophia-Antipolis Cedex; France, No. V8.8.0, Mar. 1, 2009 (Mar. 1, 2009), pp. 1-157, XP050377583, p. 45, line 3-p. 50, line 15.
Alcatel-Lucent, "Interference Coordination Framework with Results", 3GPP TSG RAN WG1 Meeting #49bis, R1-07-3187, Jun. 29, 2007, pp. 1-9.
Bell A L et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France, No. Los Angeles, USA; Jun. 24, 2009, XP050350848, [retrieved on Jun. 24, 2009].
Catt,Addition of MBSFN information on X2 interface,[online],3GPPTSG-RAN3 Meeting #64,May 4, 2009,R3-091247, Internet, p. 1-14.

(56) References Cited

OTHER PUBLICATIONS

Ericsson: 3GPP Draft; R3-083577, 3rd Generation Partnership Project (3GPP), Mobile Competence Centre ; 650, Route Des Lucioles ; F-06921 Sophia-Antipolis Cedex ; France, No. Prague, Czech Republic; Nov. 25, 2008, Nov. 25, 2008 (Nov. 25, 2008), XP050324756 [retrieved on Nov. 25, 2008] Section 10.1.5.1.
Ericsson: Considerations on Non-CA based Heterogeneous Deployments, 3GPP TSG-RAN WG1 #61, R1-102618, ST-Ericsson, 2010, 3 Pages.
Ericsson: "Simultaneous reception of transport channels in the LTE", 3GPP Draft; 36302_CR0009_(Rel-8) R2-093578, 3rd Generation Partnership Project (3GPP), Mobile Competence Centre ; 650, Route Des Lucioles ; F-06921 Sophia-Antipolis Cedex ; France, No. San Francisco, USA; May 9, 2009, May 9, 2009 (May 9, 2009), pp. 1-3, XP050340488, [retrieved on May 9, 2009].
Ericsson: "Structure of System Information", TSGR2#4(99)414, 5 pages, May 1999.
European Search Report—EP12183843—Search Authority—Hague—dated Feb. 8, 2013.
European Search Report—EP13163886—Search Authority—Berlin—dated May 27, 2013.
European Search Report—EP13165760—Search Authority—Munich—dated Jun. 4, 2013.
European Search Report—EP13165764—Search Authority—Munich—dated Jun. 4, 2013.
Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, No. Athens, Greece, Feb. 6, 2009, Feb. 6, 2009 (Feb. 6, 2009), XP050318788.
Gaie C., et al., "Distributed Discrete Resource Optimization in Heterogeneous Networks," IEEE, 2008, pp. 560-564.
Gale et al., "Distributed discreate resource optimization in Heterogeneous networks". 2008, pp. 560-564, IEEE 04641670.
Garcia F., et al.,"Design of a slew rate controlled output buffer", ASIC Conference 1998. Proceedings. Eleventh Annual IEEE International Rochester, NY, USA Sep. 13-16, 1998, New York, NY, USA. IEEE, US, Sep. 13, 1998 (Sep. 13, 1998), pp. 147-150, XP010309693, DOI: 10.1109/ASIC.1998.722821 ISBN: 978-0-7803-4980-3.
Huawei : "Enhanced ICIC for control channels to support Het.Net,", 3GPP TSG RAN WG1 meeting #61 R1-103126, May 14, 2010 (May 14, 2010), pp. 1-8, XP002660456, Montreal , Canada Retrieved from the Internet : URL:http://ftp.3gpp.org/ftp/tsg-ran/WGI-RL1/TSGR1_61/Docs/ [retrieved on Sep. 30, 2011].
Huawei, "Consideration on CSI-RS design for CoMP and text proposal to 36.814", 3GPP TSG-RAN WG1#57b R1-092364, Los Angeles, USA, Jun. 29-Jul. 3, 2009.
Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418632, [retrieved on Feb. 16, 2010].
Huawei: "Discussion on OTDOA based positioning issue", 3GPP Draft; R1-092355, 3rd Generation Partnership Project (3GPP), Mobile Competence Centre; 650, Route Des Lucioles; F-06921 Sophia-Antipolis Cedex; France, No. Los Angeles, USA, Jun. 24, 2009, XP050350879, [retrieved on Jun. 24, 2009].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 12, 2010, Apr. 6, 2010 (Apr. 6, 2010), XP050419318, [retrieved on Apr. 6, 2010].
Huawei, et al., "The possible restrictions on the configuration of almost blank subframes in Macro-Pico deployments", 3GPP Draft; R1-105150 The Possible Restrictions on the Configuration of Almost Blank Subframes in Macro-Pi Co Deployments_ Vo 5, 3rd Generation Partnership Project (3GPP), Mobile Competence Centre ; 650, Route Des Lucioles ; F-06921 Sophia-Antipolis CE, vol. RAN WG1, Oct. 5, 2010 (Oct. 5, 2010), XP050450368, pp. 1-5.
Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, Aug. 18, 2009 (Aug. 18, 2009), XP050351434 [retrieved on Aug. 18, 2009] p. 1, paragraph 1.
Inoue et al., "Space time transmit site diversity for OFDM multi base station system", 2002, pp. 30-34, IEEE 01045691.
Interdigital Communications: "eICIC Macro-Femto: Time-domain muting and ABS", 3GPP TSG-RAN WG1#63, R1-105951, Nov. 15, 2010, 6 Pages, URL: http://www.3gpp.org/ftp/tsg_ran/WG1_RL1/TSGR1_63/Docs/R1-105951.zip.
International Preliminary Report on Patentability—PCT/US2011/032367, The International Bureau of WIPO—Geneva, Switzerland—dated Oct. 16, 2012.
International Preliminary Report on Patentability—PCT/US2011/032370, The International Bureau of WIPO—Geneva, Switzerland—dated Oct. 16, 2012.
International Preliminary Report on Patentability—PCT/US2011/032373, The International Bureau of WIPO—Geneva, Switzerland—dated Oct. 16, 2012.
International Preliminary Report on Patentability—PCT/US2011/032375, The International Bureau of WIPO—Geneva, Switzerland—dated Oct. 16, 2012.
International Preliminary Report on Patentability—PCT/US2012/026303, The International Bureau of WIPO—Geneva, Switzerland, dated Aug. 13, 2013.
International Preliminary Report on Patentability—PCT/US2011/055380, The International Bureau of WIPO—Geneva, Switzerland, dated Apr. 18, 2013.
International Search Report—PCT/US2010/038884, International Search Authority—European Patent Office—dated Dec. 15, 2010.
International Search Report—PCT/US2011/041643, ISA/EPO—dated Oct. 18, 2011.
International Search Report and Written Opinion—PCT/US2010/046455—International Search Authority, European Patent Office,dated Oct. 18, 2010.
International Search Report and Written Opinion—PCT/US2011/032373, ISA/EPO—dated Jul. 19, 2011.
International Search Report and Written Opinion—PCT/US2011/032375—ISA/EPO—dated Jan. 25, 2012.
International Search Report and Written Opinion—PCT/US2011/055380—ISA/EPO—dated Dec. 23, 2011.
International Search Report and Written Opinion—PCT/US2012/026303—ISA/EPO—dated Nov. 30, 2012.
International Search Report and Written Opinion—PCT/US2010/038212—International Search Authority, European Patent Office,dated Dec. 15, 2010.
International Search Report and Written Opinion—PCT/US2010/045196, International Search Authority—European Patent Office—dated Mar. 25, 2011.
International Search Report and Written Opinion—PCT/US2010/048654—International Search Authority, European Patent Office,dated Nov. 5, 2010.
Freescale: "Considerations on Radio Link Monitoring Requirements", R4-083090, 3GPP, Nov. 14, 2008, pp. 1-4.
Huawei: "Functions Related to Inter-cell RRM", R3-060116, 3GPP, Feb. 13-17, 2006, pp. 1-4.
Huawei: "Practical Analysis of CoMP Coordinated Beamforming", R1-093036, 3GPP, Aug. 18, 2009, pp. 1-6.
Huawei: "Radio Link Failure for DC-HSUPA", R2-095027, 3GPP, Aug. 26, 2009, pp. 1-3.
European Search Report—EP13000903—Search Authority—The Hague—dated Oct. 16, 2017.

\* cited by examiner

METHODS AND APPARATUS FOR SUBFRAME INTERLACING IN HETEROGENEOUS NETWORKS

CROSS-REFERENCE TO RELATED APPLICATIONS

This application is a continuation of U.S. Pat. No. 9,281,932 granted on Mar. 8, 2016 (U.S. patent application Ser. No. 14/169,142 filed on Jan. 30, 2014), which is a continuation of U.S. Pat. No. 8,942,192 granted on Jan. 27, 2015 (U.S. patent application Ser. No. 12/882,090 filed Sep. 14, 2010), which application claims priority under 35 U.S.C. § 119(e) to U.S. Provisional Patent Application Ser. No. 61/242,678 entitled MULTIPLEXING SUBFRAME INTERLACES BETWEEN NODES ON HETEROGENEOUS NETWORKS, filed on Sep. 15, 2009, the content of which is hereby incorporated by reference herein in its entirety for all purposes.

FIELD

This application is directed generally to wireless communications systems. More particularly, but not exclusively, the application relates to methods and apparatus for providing time-division multiplexed subframes in a wireless communication network, such as a long term evolution (LTE) network, as well as for adjusting network nodes based on associated performance metrics.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), EnodeBs or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-in-single-out, single-in-multiple out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into NS independent channels, which are also referred to as spatial channels. Generally, each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Base station nodes sometimes referred to as eNBs have different capabilities for deployment in a network. This includes transmission power classes, access restriction, and so forth. In one aspect, heterogeneous network characteristics create wireless coverage dead spots (e.g., Donut coverage hole). This may cause severe inter-cell interference requiring undesirable user equipment cell association. In general, heterogeneous network characteristics require deep penetration of physical channels which may cause unwanted interference between nodes and equipment on the respective network.

As the number of mobile stations deployed increases, the need for proper bandwidth utilization becomes more important. Moreover, with the introduction of semiautonomous base stations for managing small cells, such as femtocells and picocells, in systems such as LTE, interference with existing base stations may become an increasing problem.

SUMMARY

This disclosure is directed generally to wireless communications systems using subframe partitioning. The disclosure relates, for example, to methods and apparatus for providing time-division multiplexed subframes in a wireless communication network, such as a long term evolution (LTE) network, as well as for adjusting network nodes based on associated performance metrics.

In one aspect, the disclosure may relate to a method for wireless signal transmission. The method may include storing, in a wireless network base station, a subframe partition configuration including an allocation of a first downlink (DL) resource to be one of a semi-static resource or a dynamic resource. The method may further include, sending a first signal consistent with the DL resource allocation from the base station.

The method may further include, for example, transmitting, from the base station, a second signal consistent with a second DL resource allocation. The second DL resource allocation may be allocated by the subframe partition configuration to be one of a semi-static resource or dynamic resource. The first DL resource may be, for example, orthogonal to a second DL resource allocated to a second base station. The second DL resource may be allocated by the subframe partition configuration to be, for example, one of a semi-static resource or a dynamic resource. The first DL resource and the second DL resource may be time-division multiplexed and/or frequency division multiplexed.

The subframe partition configuration may further include, for example, an allocation of at least one unassigned resource. The first base station may be, for example, one of a macrocell, a femtocell, or a picocell base station.

The method may further include, for example, negotiating, with a second base station, a subframe resource allocation configuration and determining, based on the negotiation, the subframe resource allocation. The subframe resource allocation may be stored, for example in a memory.

In another aspect, the disclosure relates to a computer program product. The computer program product may include a computer-readable medium containing codes for causing a computer to store, in a wireless network base station, a subframe partition configuration including an allocation of a first downlink (DL) resource to be one of a semi-static resource or dynamic resource. The codes may further include codes for causing the computer to transmit, from the base station, a first signal consistent with the first DL resource allocation.

In another aspect, the disclosure relates to a communications device. The communications device may include a memory configured to store, in a wireless network base station, a subframe partition configuration including an allocation of a first downlink (DL) resource to be one of a semi-static resource or dynamic resource. The communications device may further include a transmit module configured to transmit, from the base station, a first signal consistent with the first DL resource allocation.

The communications device may further include, for example, a processor module configured to negotiate, with a second base station, a subframe resource allocation configuration and determine, based on the negotiation, the subframe resource allocation. The device may further include a memory configured to store the subframe resource allocation.

In another aspect, the disclosure relates to a communications device. The communications device may include means for storing, in a wireless network base station, a subframe partition configuration including an allocation of a first downlink (DL) resource to be one of a semi-static resource or dynamic resource and means for transmitting, from the base station, a first signal consistent with the first DL resource allocation.

In another aspect, the disclosure relates to a method for wireless signal transmission. The method may include determining, at a first wireless network base station via a communication connection with a second wireless network base station, a subframe partition configuration. The method may further include sending, from the first wireless network base station, a first signal consistent with the subframe partition configuration.

The subframe partition configuration may include, for example, a first DL resource allocated to the first wireless network base station and may further include a second DL resource allocated to the second wireless network base station. The first DL resource and the second DL resource may be, for example, semi-static resources. Alternately or in addition, the first DL resource and the second DL resource may be, for example, dynamic resources. Combinations of semi-static and dynamic resources may be used. In addition, the subframe partition configuration may include, for example, a DL resource allocated to the first wireless network base station. The subframe partition configuration may further include a second DL resource allocated to the first wireless network base station. The first DL resource may be, for example, a semi-static resource and the second DL resource may be, for example, a dynamic resource. The subframe partition configuration may further include, for example, an unallocated resource. The subframe partition may include partial subframe allocations, such as partial semi-static or partial dynamic subframe allocations.

The communication connection may be a wireless connection, such as, for example, an X2 connection. Alternately or in addition, the communication connection may be a backhaul connection. If a backhaul connection is used, it may include, for example, a S1 connection. The first base station and.or the second base station may be in communication with a core network. The determining may be performed, for example, in conjunction with the core network. Alternately, the determining may be performed independent of a core network, where the core network may be associated with the first base station and/or the second base station.

The method may further include, for example, receiving, from a user equipment (UE), a second signal, where the second signal may include a signal metric generated responsive to the first signal.

In another aspect, the disclosure relates to a computer program product. The computer program product may include a computer-readable medium containing codes for causing a computer to determine, at a first wireless network base station via a communication connection with a second wireless network base station, a subframe partition configuration. The codes may further include codes for causing the computer to transmit, from the first wireless network base station, a first signal consistent with the subframe partition configuration.

In another aspect, the disclosure relates to a communications device. The communications device may include a subframe determination module configured to determine, at a first wireless network base station via a communication connection with a second wireless network base station, a subframe partition configuration. The communications device may further include a transmit module configured to transmit, from the first wireless network base station, a first signal consistent with the subframe partition configuration.

In another aspect, the disclosure relates to a communications device. The communications device may include means for determining, at a first wireless network base station via a communication connection with a second wireless network base station, a subframe partition configuration. The communications device may further include means for transmitting, from the first wireless network base station, a first signal consistent with the subframe partition configuration.

In another aspect, the disclosure relates to a method for wireless signal measurement. The method may include storing, in a wireless network base station, a subframe partition configuration including an allocation of a first semi-static DL resource and sending, from the first wireless network base station, a first signal consistent with the first semi-static DL resource. The method may further include receiving responsive to the first signal, from a user equipment (UE) associated with the base station, a signal metric usable for allocating a communications resource.

The first semi-static DL resource may be, for example, orthogonal to a second semi-static DL resource allocated to a second base station. The signal metric may be, for example, an RLM metric, and the RLM metric may be determined during a semi-static subframe. The semi-static subframe may be signaled to the UE prior to the transmitting. The method may further include, for example, allocating the communications resource based at least in part on the signal metric.

In another aspect, the disclosure relates to a computer program product. The computer program product may include a computer-readable medium containing codes for causing a computer to store, in a wireless network base station, a subframe partition configuration including an allocation of a first semi-static DL resource and transmit, from the first wireless network base station, a first signal consistent with the first semi-static DL resource. The codes may further include codes for causing the computer to receive, in response to the first signal, from a user equipment (UE) associated with the base station, a signal metric usable for allocating a communications resource.

In another aspect, the disclosure relates to a communication device. The communications device may include a memory configured to store a subframe partition configuration including an allocation of a first semi-static DL resource and a transmitter module configured to send a first signal consistent with the first semi-static DL resource. The communications device may further include a receiver configured to receive responsive to the first signal, from a user equipment (UE) associated with the communication device, a signal metric usable for allocating a communications resource.

In another aspect, the disclosure relates to a communication device. The communications device may include means for storing a subframe partition configuration including an allocation of a first semi-static DL resource and means for transmitting a first signal consistent with the first semi-static DL resource. The communications device may further include means for receiving responsive to the first signal, from a user equipment (UE) associated with the communication device, a signal metric usable for allocating a communications resource.

In another aspect, the disclosure relates to a method for scheduling transmission in a communications network. The method may include receiving, from a first wireless network node, a request to allocate subframe resources and allocating subframe resources between the first wireless network node and a second wireless network node in accordance with a subframe resource configuration. The method may further include providing the subframe resource configuration to the first wireless network node and the second wireless network node.

The subframe resource configuration may include, for example, a semi-static subframe resource allocation and/or a dynamic subframe resource allocation. Alternately or in addition, the subframe resource configuration may include a non-assigned resource allocation. The subframe resource configuration may include, for example, a first semi-static resource allocation assigned to the first wireless network node and a second semi-static resource allocation assigned to the second wireless network node. The first semi-static resource allocation and the second semi-static resource allocation may be configured to be orthogonal.

In another aspect, the disclosure relates to a computer program product. The computer program product may include a computer-readable medium containing codes for causing a computer to receive, from a first wireless network node, a request to allocate subframe resources and allocate subframe resources between the first wireless network node and a second wireless network node in accordance with a subframe resource configuration. The codes may further include codes for providing the subframe resource configuration to the first wireless network node and the second wireless network node.

In another aspect, the disclosure relates to a system for managing subframe allocation. The system may include a receiver module configured to receive, from a first wireless network node, a request to allocate subframe resources and a processor module configured to determine an allocating of subframe resources between the first wireless network node and a second wireless network node in accordance with a subframe resource configuration. The system may further include a transmit module configured to provide the subframe resource configuration to the first wireless network node and the second wireless network node.

In another aspect, the disclosure relates to a system for managing subframe allocation. The system may include means to receive, from a first wireless network node, a request to allocate subframe resources and means to determine an allocating of subframe resources between the first wireless network node and a second wireless network node in accordance with a subframe resource configuration. The system may further include means for providing the subframe resource configuration to the first wireless network node and the second wireless network node.

In another aspect, the disclosure relates to a method for wireless communications. The method may include receiving, at a UE, from a base station, information relating to a predetermined subframe resource allocation and receiving, during a time interval associated with the resource allocation, a first signal. The method may further include determining a signal metric associated with the first signal and sending the signal metric to the base station.

The signal metric may be, for example, a Radio Link Monitoring (RLM) metric. The information may include, for example, Radio Resource Management (RRM) control information. The information may also include channel feedback information and/or channel quality indication (CQI) information. The base station may be associated with a first cell and the first signal may be transmitted from a node associated with a second cell. The first cell may be, for example, a macrocell and the second cell may be a picocell or femtocell. Alternately, the first cell may be a picocell or femtocell and the second cell may be a macrocell. Alternately, the first and second cells may be macrocells or the first and second cells may be picocells or femtocells.

The first signal may be, for example, a reference signal. The reference signal may be a common reference signal (CRS) and/or a channel state information reference signal (CSI-RS).

In another aspect, the disclosure relates to a computer program product. The computer program product may include a computer-readable medium containing codes for causing a computer to receive, at a UE, from a base station, information relating to a predetermined subframe resource allocation and receive, during a time interval associated with the resource allocation, a first signal. The codes may further include codes for determining a signal metric associated with the first signal and/or sending signal metric to the base station.

In another aspect, the disclosure relates to a device for wireless communications. The device may include a receiver module configured to receive, at a UE, from a base station, information relating to a predetermined subframe resource allocation and receive, during a time interval associated with the resource allocation, a first signal. The device may further include a processor module configured to determine a signal metric associated with the first signal and/or a transmit module configured to send the signal metric to the base station.

In another aspect, the disclosure relates to a device for wireless communications. The device may include means for receiving, at a UE, from a base station, information relating to a predetermined subframe resource allocation and means for receiving, during a time interval associated with the resource allocation, a first signal. The device may further include means for determining a signal metric associated with the first signal and/or means for sending the signal metric to the base station.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
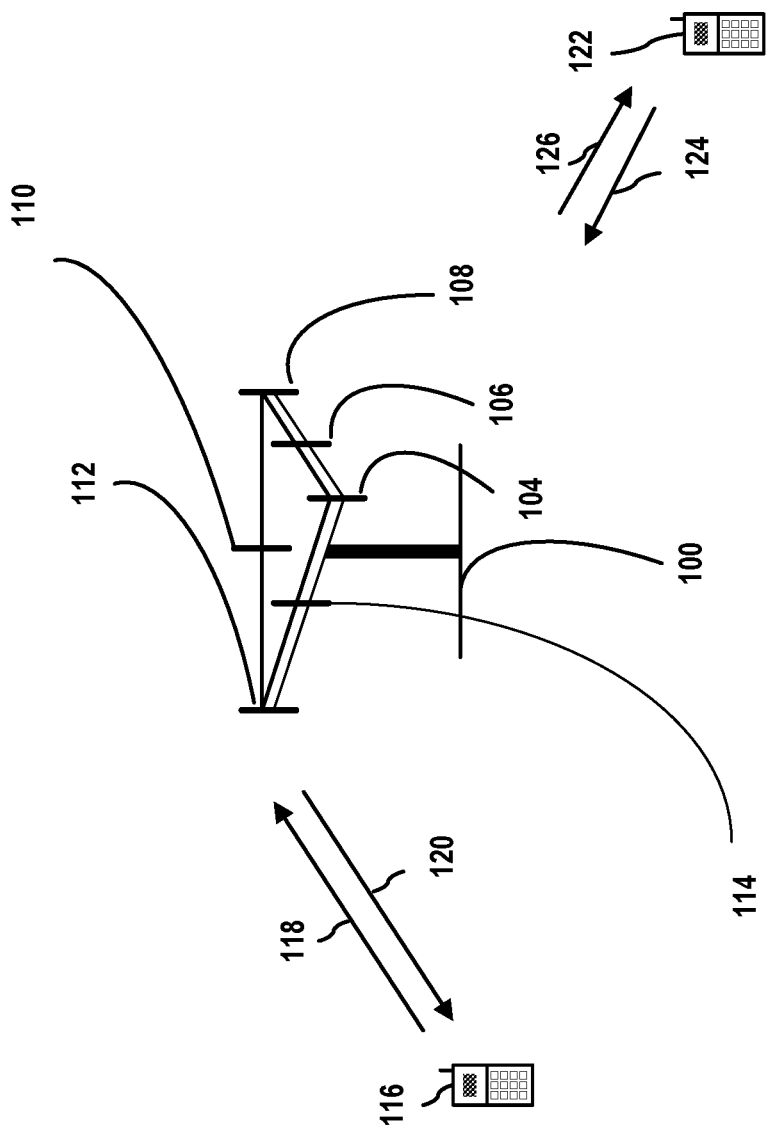
FIG. 1 illustrates details of a wireless communications system.

This disclosure relates generally to interference coordination and management in wireless communications systems. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

In addition, the DL PHY channels may include the following:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)
  The UL PHY Channels may include the following:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:
  AM Acknowledged Mode
  AMD Acknowledged Mode Data
  ARQ Automatic Repeat Request
  BCCH Broadcast Control CHannel
  BCH Broadcast CHannel
  C- Control-
  CCCH Common Control CHannel
  CCH Control CHannel
  CCTrCH Coded Composite Transport Channel
  CP Cyclic Prefix
  CRC Cyclic Redundancy Check
  CTCH Common Traffic CHannel
  DCCH Dedicated Control CHannel
  DCH Dedicated CHannel
  DL DownLink
  DSCH Downlink Shared CHannel
  DTCH Dedicated Traffic CHannel
  FACH Forward link Access CHannel
  FDD Frequency Division Duplex
  L1 Layer 1 (physical layer)
  L2 Layer 2 (data link layer)
  L3 Layer 3 (network layer)
  LI Length Indicator
  LSB Least Significant Bit
  MAC Medium Access Control
  MBMS Multmedia Broadcast Multicast Service
  MCCH MBMS point-to-multipoint Control CHannel
  MRW Move Receiving Window
  MSB Most Significant Bit
  MSCH MBMS point-to-multipoint Scheduling CHannel
  MTCH MBMS point-to-multipoint Traffic CHannel
  PCCH Paging Control CHannel
  PCH Paging CHannel
  PDU Protocol Data Unit
  PHY PHYsical layer
  PhyCH Physical CHannels
  RACH Random Access CHannel
  RLC Radio Link Control
  RRC Radio Resource Control
  SAP Service Access Point
  SDU Service Data Unit
  SHCCH SHared channel Control CHannel
  SN Sequence Number
  SUFI SUper FIeld
  TCH Traffic CHannel
  TDD Time Division Duplex
  TFI Transport Format Indicator
  TM Transparent Mode
  TMD Transparent Mode Data
  TTI Transmission Time Interval
  U- User-
  UE User Equipment
  UL UpLink
  UM Unacknowledged Mode
  UMD Unacknowledged Mode Data
  UMTS Universal Mobile Telecommunications System
  UTRA UMTS Terrestrial Radio Access
  UTRAN UMTS Terrestrial Radio Access Network
  MBSFN Multicast broadcast single frequency network
  MCE MBMS coordinating entity
  MCH Multicast channel
  DL-SCH Downlink shared channel
  MSCH MBMS control channel
  PDCCH Physical downlink control channel
  PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from the base station, access point or eNodeB to the terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. +Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the PDCCH is used for sending control, the PHICH for sending ACK/NACK, the PCFICH for specifying the number of control symbols, the the Physical Downlink Shared Channel (PDSCH) for data transmission, the Physical Multicast Channel (PMCH) for broadcast transmission using a Single Frequency Network, and the Physical Broadcast Channel (PBCH) for sending important system information within a cell. Supported modulation formats on the PDSCH in LTE are QPSK, 16QAM and 64QAM.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM and 64QAM.

If virtual MIMO/spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates details of an implementation of a multiple access wireless communication system, which may be an LTE system. An evolved Node B (eNB) 100 (also know as an access point or AP) may include multiple antenna groups, one including 104 and 106, another including 108 and 110, and an additional including 112 and 114. In FIG. 1, only two antennas are shown for each antenna group, however, more or fewer antennas may be utilized for each antenna group. A user equipment (UE) 116 (also known as an access terminal or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 is in communication with antennas 106 and 108, where antennas 106 and 108 transmit information to UE 122 over forward link 126 and receive information from access terminal 122 over reverse link 124. In a frequency division duplex (FDD) system, communication links 118, 120, 124 and 126 may use different frequency for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 400 utilize beam-forming in order to improve the signal-to-noise ratio of forward links for the different access terminals 116 and 124. Also, an eNB using beam-forming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology.

Figure 2:
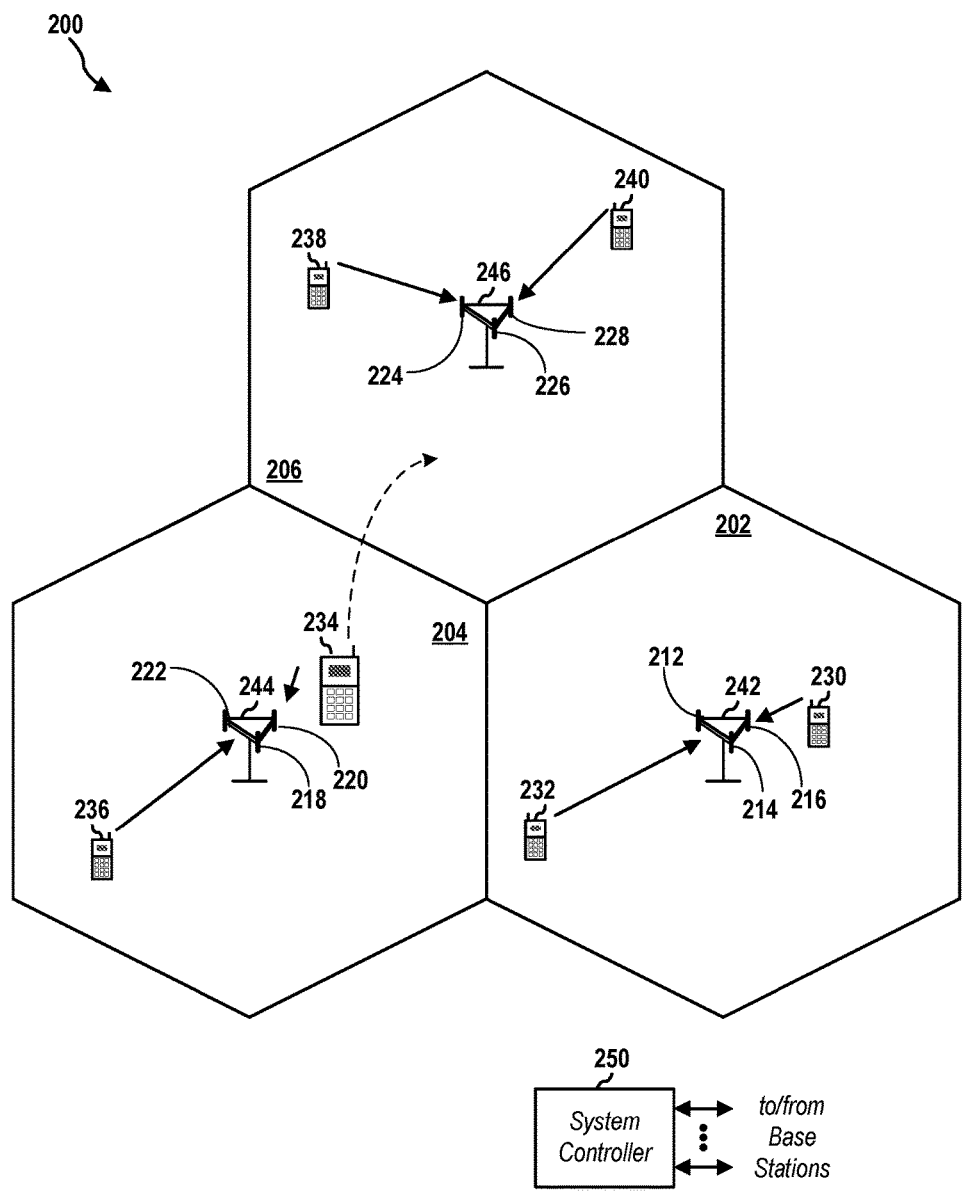
FIG. 2 illustrates details of a wireless communications system having multiple cells.

FIG. 2 illustrates details of an implementation of a multiple access wireless communication system 200, such as an LTE system. The multiple access wireless communication system 200 includes multiple cells, including cells 202, 204, and 206. In one aspect the system 200, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 can include several wireless communication devices, e.g., user equipment or UEs, which can be in communication with one or more sectors of each cell 202, 204 or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network, such as may be used to perform functions as further described herein related to subframe partition allocation and configuration.

Figure 3:
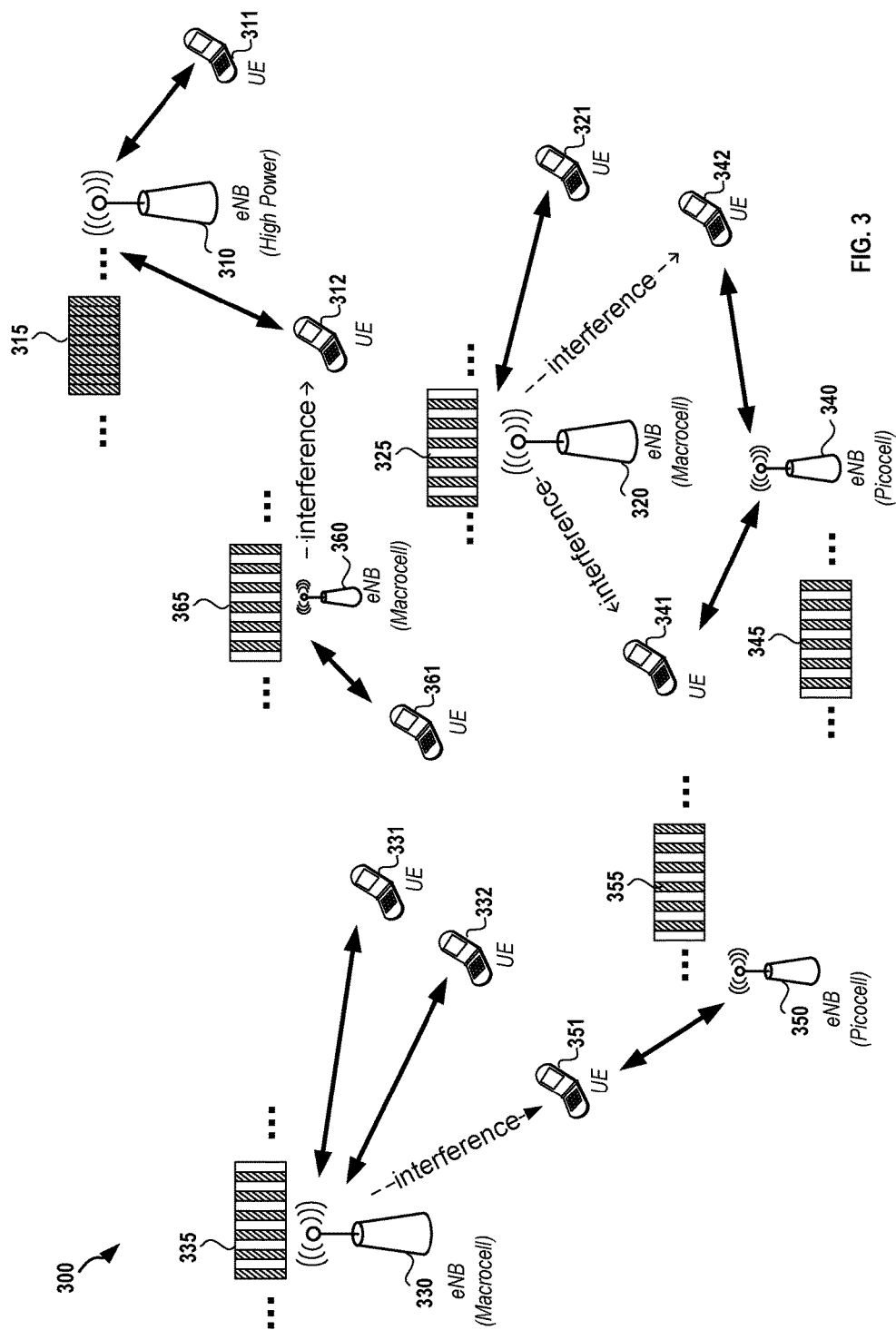
FIG. 3 illustrates details of a multi-cell wireless communications system having nodes of different types.

FIG. 3 illustrates details of an implementation of a multiple access wireless communication system 300, such as an LTE system, on which subframe partitioning may be implemented. Various elements of system 300 may be implemented using components and configurations as shown in FIGS. 1 and 2. System 300 may be configured as a heterogeneous network where various access points or eNBs having different characteristics may be deployed. For example, eNBs of different types such as macrocell eNBs, picocell eNBs and femtocell eNBs may be deployed in proximity in a particular area or region. In addition, eNBs of different power classes may also be deployed in various implementations. The eNBs shown in FIG. 3, along with their associated cells, may be configured to use subframe partitioning as further described herein. In general, subframe partitioning is provided in connected mode to facilitate network interference mitigation and/or provide range extension.

Network 300 includes six eNBs 310, 320, 330, 340, 350, and 360. These eNBs may be of different types and/or power classes in various implementations. For example, in system 300, eNB 310 may be a high power eNB associated with a macrocell, eNB 320 may be another macrocell eNB that may operate in a different power class, eNB 330 may be another eNB operating in the same or a different power class, and eNBs 340 and 350 may be picocell eNBs. Other eNBs of other types and/or classes, such as femtocell nodes, etc. (not shown) may also be included. eNB 330 may be in communication with served UEs 331 and 332, and may further create interference with UE 351, which may be served by eNB 350. Accordingly, inter-cell interference coordination between eNB 330 and eNB 350 may be used to mitigate this interference, such as is further described herein. Likewise, UEs 341 and 342, which may be served by eNB 340, may be subject to interference from macrocell eNB 320, which may be serving UE 321. In these two examples, macrocell nodes may create interference with picocell nodes, however, in other cases, picocell nodes may create interference with macrocell nodes (and/or femtocell nodes), and in addition, macrocell nodes may create interference with each other. For example, macrocell eNB 360, which is serving UE 361, may create interference with UE 312, which is being served by eNB 310, which may be a high power eNB, which may also be serving UE 311.

As shown in the simplified timing diagrams 315-365 of FIG. 3, in one aspect, each eNB and its associated UEs may be allocated certain subframes (as shown hatched in FIG. 3) on which to operate. Subframes shown in white may be restricted so that transmissions are limited or prohibited. Some eNBs may be allocated all or most subframes. For example, eNB 310 is shown as being able to use all subframes in timing diagram 315. Other eNBs may be assigned only specific subframes on which to operate. For example, eNB 330 is assigned certain subframes as shown in timing diagram 335, whereas eNB 360 is assigned orthogonal subframes as shown in diagram 365 (where the subframes are assigned to be time-division orthogonal). Various other combinations of subframes may be utilized in various embodiments, including those further described subsequently herein.

Figure 4A:
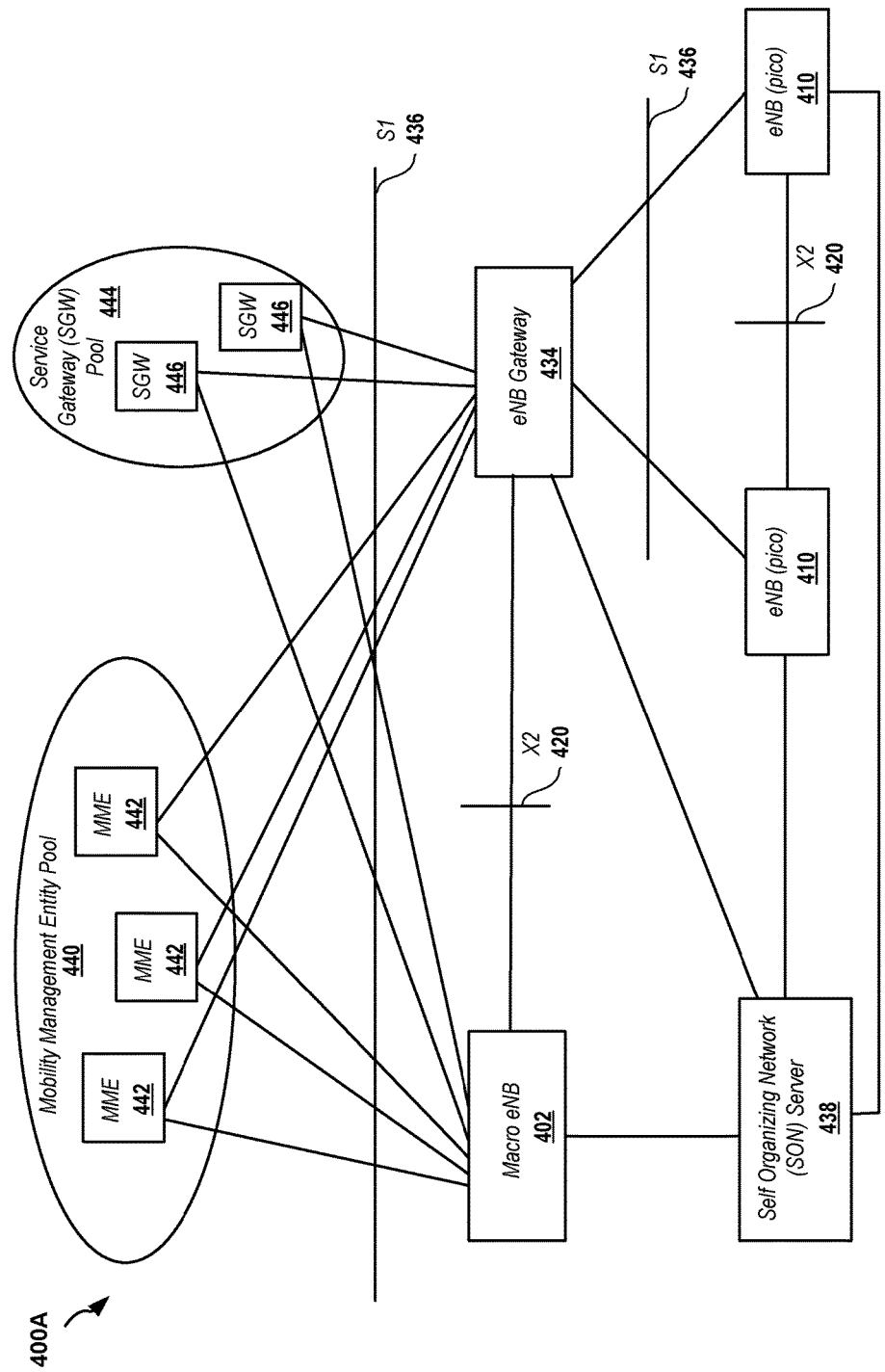
FIG. 4A illustrates details of base station to base station communication connections in a wireless communications system.

Allocation of subframes may be done by direct negotiations between eNBs such as those shown in FIG. 3, and/or may be done in conjunction with a backhaul network. FIG. 4A illustrates details of an example network embodiment 400B of eNB interconnection with other eNBs. Network 400A may include a macro-eNB 402 and/or multiple additional eNBs, which may be picocell eNBs 410. Network 400 may include an HeNB gateway 434 for scalability reasons. The macro-eNB 402 and the gateway 434 may each communicate with a pool 440 of mobility management entities (MME) 442 and/or a pool 444 of serving gateways (SGW) 446. The eNB gateway 434 may appear as a C-plane and a U-plane relay for dedicated S1 connections 436. An S1 connection 436 may be a logical interface specified as the boundary between an evolved packet core (EPC) and an Evolved Universal Terrestrial Access Network (EUTRAN). As such, it provides an interface to a core network (not shown) which may be further coupled to other networks. The eNB gateway 434 may act as a macro-eNB 402 from an EPC point of view. The C-plane interface may be S1-MME and the U-plane interface may be S1-U. Allocation of subframes may be done by direct negotiations between eNBs such as those shown in FIG. 3, and/or may be done in conjunction with a backhaul network. Network 400 may includes a macro-eNB 402 and multiple additional eNBs, which may be picocell eNBs 410.

The eNB gateway 434 may act towards an eNB 410 as a single EPC node. The eNB gateway 434 may ensure S1-flex connectivity for an eNB 410. The eNB gateway 434 may provide a 1:n relay functionality such that a single eNB 410 may communicate with n MMEs 442. The eNB gateway 434 registers towards the pool 440 of MMEs 442 when put into operation via the S1 setup procedure. The eNB gateway 434 may support setup of S1 interfaces 436 with the eNBs 410.

Network 400B may also include a self organizing network (SON) server 438. The SON server 438 may provide automated optimization of a 3GPP LTE network. The SON server 438 may be a key driver for improving operation administration and maintenance (OAM) functions in the wireless communication system 400. An X2 link 420 may exist between the macro-eNB 402 and the eNB gateway 434. X2 links 420 may also exist between each of the eNBs 410 connected to a common eNB gateway 434. The X2 links 420 may be set up based on input from the SON server 438. An X2 link 420 may convey ICIC information. If an X2 link 420 cannot be established, the S1 link 436 may be used to convey ICIC information. Backhaul signaling may be used in communication system 400 to manage various functionality as described further herein between macro-eNB 402 and eNBs 410. For example, these connections may be used as further described successively herein to facilitate subframe allocation coordination and scheduling.

Figure 4B:
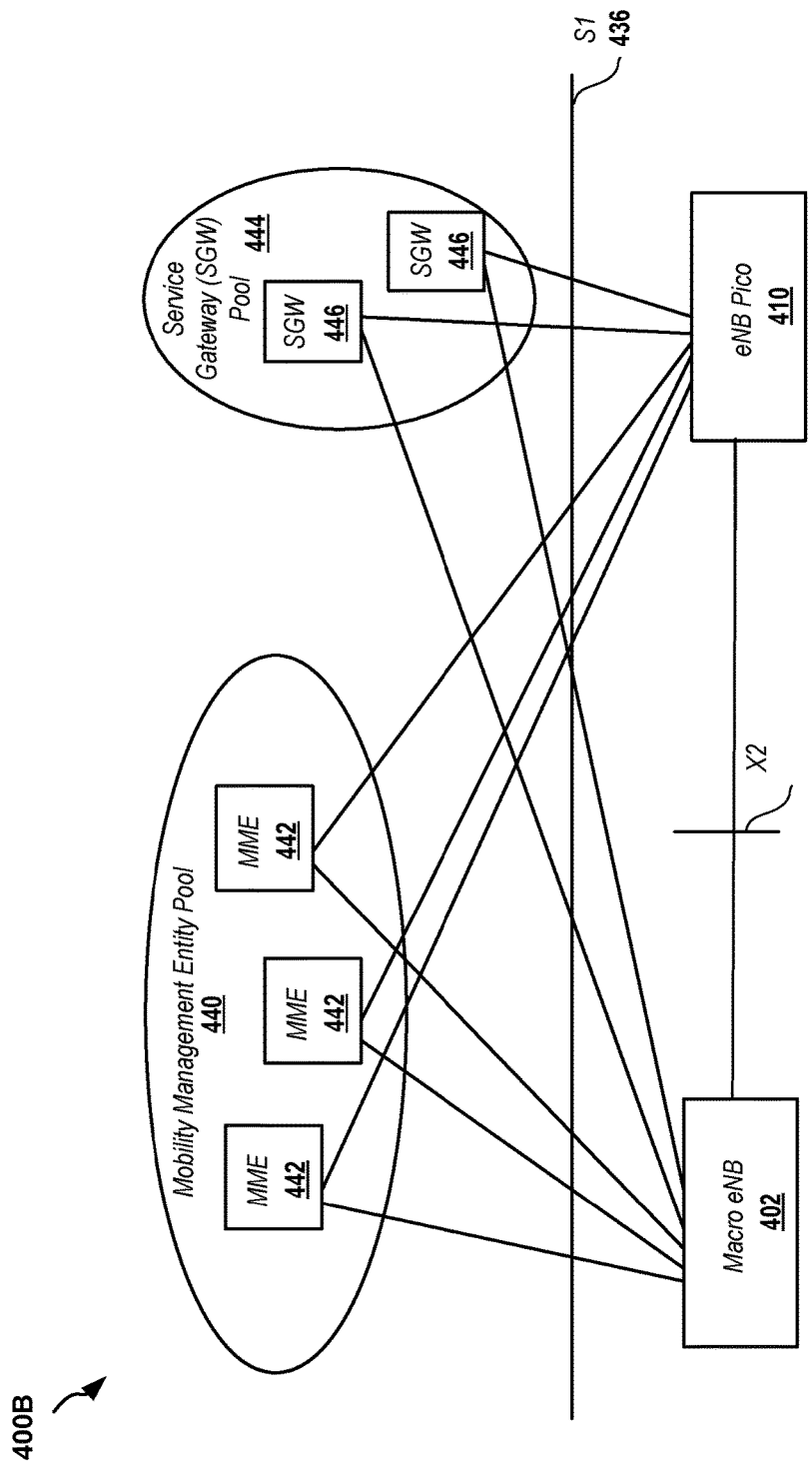
FIG. 4B illustrates details of a base station to base station communication connections in a wireless communications system.

FIG. 4B illustrates another example embodiment of a network embodiment 400B of eNB interconnection with other eNBs. In network 400B, no SON server is included, and macro eNBs, such as eNB 402, may communicate with other eNBs, such as pico eNB 410 (and/or with other base stations that are not shown).

Figure 5:
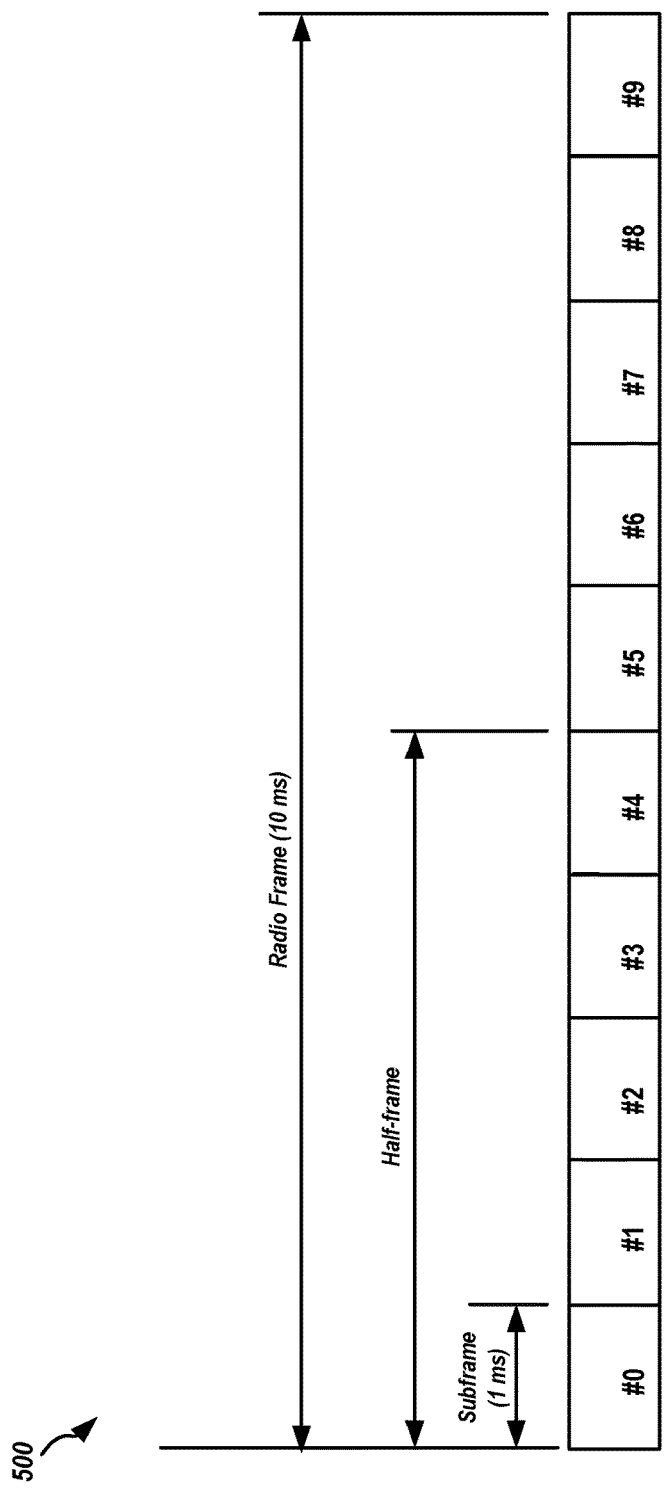
FIG. 5 illustrates an example radio frame and subframes in an LTE communications system.

FIG. 5 illustrates an example frame structure 500 as may be used in, for example, an LTE time division duplex (TDD) system. In frame structure 500, a radio frame consists of 10 subframes, denoted as subframes #0 thru #9. The radio frame may be divided into two half frames consisting of 5 subframes as shown. In an exemplary implementations, each subframe has a duration of 1 millisecond (ms), resulting in a radio frame duration of 10 ms.

In one aspect, subframes of a radio frame, such as are shown in, for example, FIG. 5, may be allocated in an interlaced fashion to particular cells and associated eNBs, such as are shown in, for example, FIG. 3.

Figure 6:
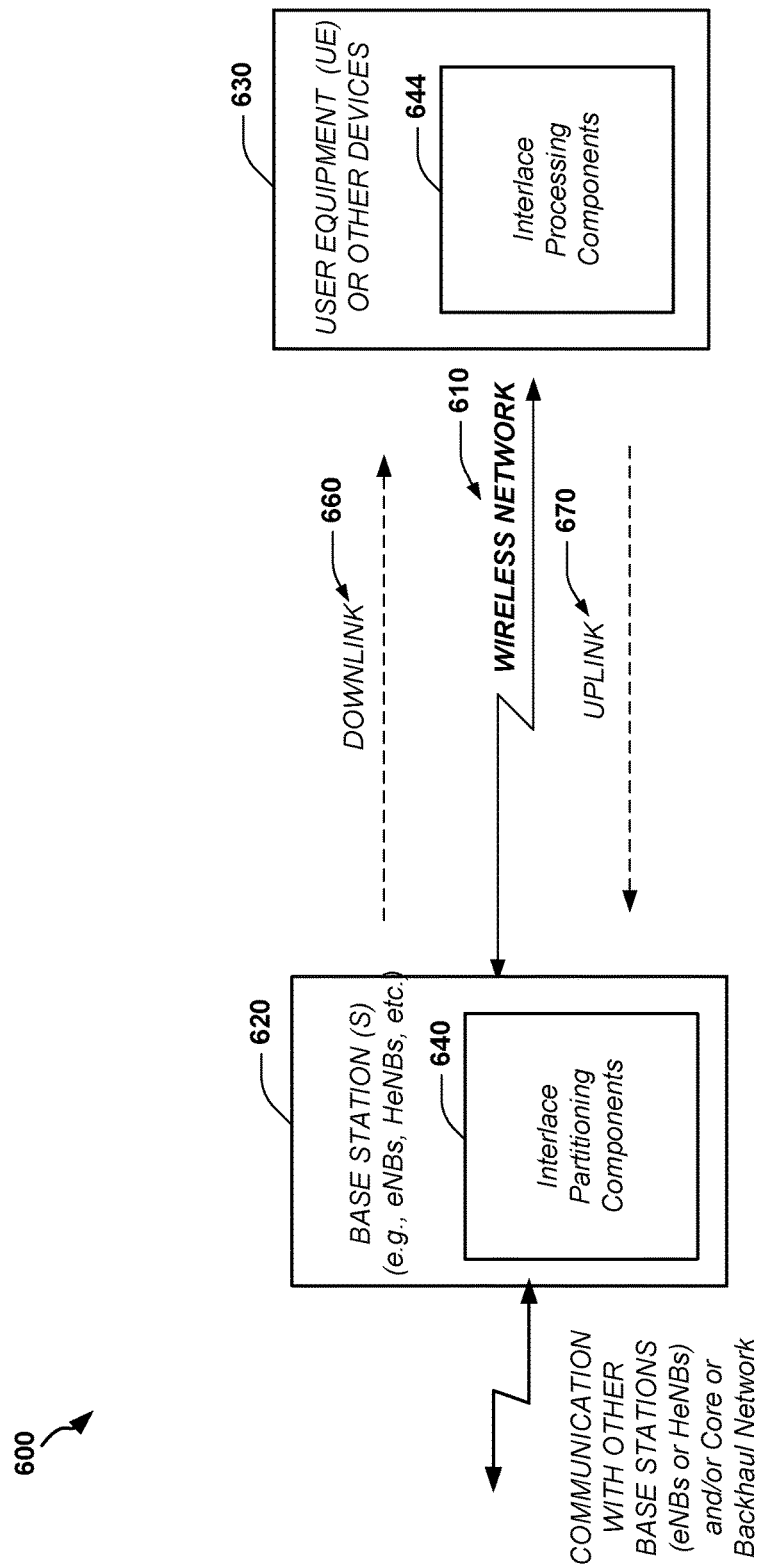
FIG. 6 illustrates an example component configuration in a wireless network configured for subframe interlacing.

FIG. 6 illustrates an example wireless network 600 for utilizing partitioned subframes. System 600 may employ subframe interlace partitioning across a wireless network 610, such as in a network configuration as shown previously in FIGS. 1-4. System 600 includes one or more eNBs 620 (also referred to as a node, base station, serving eNB, target eNB, femtonode, piconode, etc), which can be an entity capable of communication over the wireless network 610 to various devices 630.

For instance, each device 630 can be a UE (also referred to as a terminal or access terminal (AT), user equipment, mobility management entity (MME) or mobile device). The eNB(s) or base station(s) 120 may include an interlace partitioning component 640, which may be a module wherein subframe interlaces can be semi-statically or dynamically configured as further described herein to mitigate interference in the network 610. The devices 630 may include an interlace processing component 644 which may be a module configured to receive and respond to the configured subframe interlaces as further described herein. As shown, the eNB 620 may communicate to the device or devices 630 via downlink (DL) 660, and receive data via uplink (UL) 670. Such designation as uplink and downlink is arbitrary as the device 630 can also transmit data via downlink and receive data via uplink channels. It is noted that although two wireless network components 620 and 630 are shown, that more than two components can be employed on network 610, where such additional components can also be adapted for subframe interlace processing described herein.

In general, interlacing techniques may be provided to mitigate interference between nodes in a heterogeneous wireless network 610 (which may also be denoted as a hetnet). In one aspect, time domain multiplexing (TDM) partition of subframe interlaces may be provided among eNB classes and/or types to address near-far interference problems for user equipment in connected mode, and/or to address other problems or concerns. Subframe interlaces can be allocated to an eNB class and can be semi-statically assigned at the base station 620, where the user equipment 630 is reliably signaled ahead of time of the allocation (i.e., in a semi-static allocation, a device, such as a UE 630, is signaled in advance of transmission of a particular subframe allocation or allocations). The semi-static allocation can then be used, for example, for device 630 and/or eNB physical layer control procedures. Semi-static allocations may be used for both UE and eNB physical layer control procedures.

In another aspect, subframe interlaces can be dynamically assigned, where assignment is performed in a dynamic fashion and is unknown to the device 630 ahead of time. Dynamic assignments may typically be employed for eNB 620 (but typically not UE) physical layer control procedures. Subframe interlace partitioning can be denoted by triplet identifiers (L, N, K), for example, as will be described in more detail subsequently. Dynamic allocations will generally be used for eNB, but not UE, physical layer control procedures.

System design for heterogeneous network design (e.g., LTE-A) can employ existing signals and channels that utilize system acquisition, random access, data communication, control, and data. Advanced receiver algorithms may be provided to enable deep channel penetration and provide more accurate measurements at the user equipment 630 and eNB 620. This approach may enable more flexible UE cell association and may facilitate better coordination across cells. In addition, TDM-based interlace division among different eNB power classes can be semi-static or dynamic as previously described. Additional dynamic resource coordination components among eNBs 620 may also be provided (such as, for example, backhaul communications channels between nodes such as are shown in FIG. 4).

It is noted that implementations of system 600 can be employed with a UE or other fixed or mobile device, and can be, for instance, implemented as a module such as an SD card, a network card, a wireless network card, a computer (including laptops, desktops, personal digital assistants PDAs), mobile phones, smart phones, or any other suitable device that can be utilized to access a network. The UE may access the network by way of an access component (not shown).

In one example, a connection between the UE and the access components may be wireless in nature, in which access components may be the eNB (or other base station) and the mobile device is a wireless terminal. For instance, the terminal and base station may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, and the like. The access component can include one or more interfaces, e.g., communication modules, for communicating with other network nodes. Additionally, the access component can be a base station such as an eNB (or other wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals, such as is shown in, for example, FIGS. 2 and 3.

Figure 7:
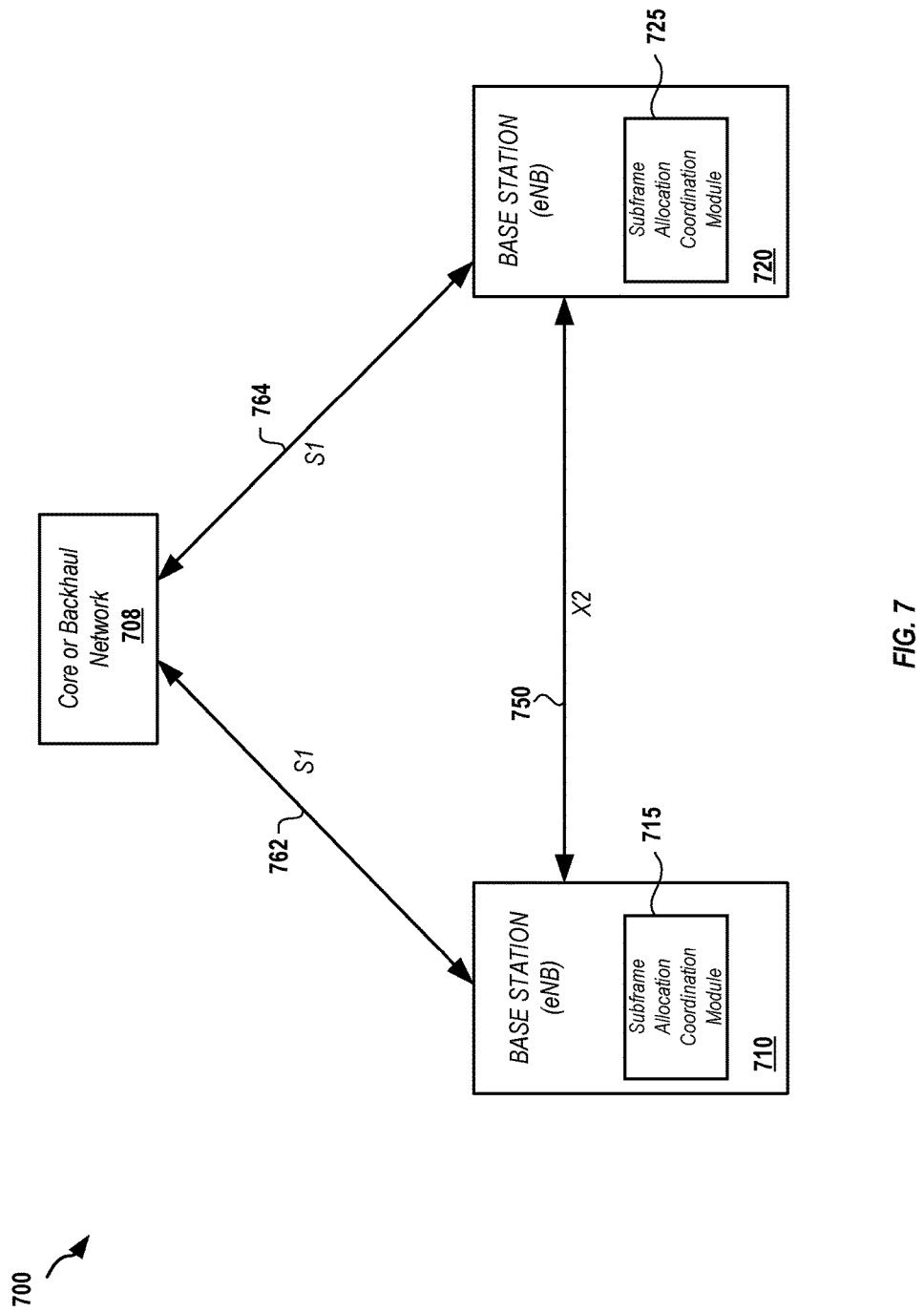
FIG. 7 illustrates an example component configuration in a wireless network configured for subframe interlacing.

FIG. 7 illustrates details of an embodiment of wireless network components 700 that may be used to implement subframe interlace partitioning. In particular, two or more base stations, shown as eNBs 710 and 720, may communicate to request interlaces (i.e., particular subframe allocations), negotiate or determine subframe allocations, and/or transmit to associated network components, such as associated UEs (not shown) using interlaced subframes. Each of eNBs 710 and 720 may include a subframe allocation and coordination module 715, 725 to perform the subframe allocation and usage functions described herein. Base stations 710 and 720 may communicate via an X2 connection 750, and/or via an S1 connection 762, 764. A core or backhaul network 708 may provide interconnectivity and/or may manage, in whole or in part, subframe partitioning and allocation.

Figure 8:
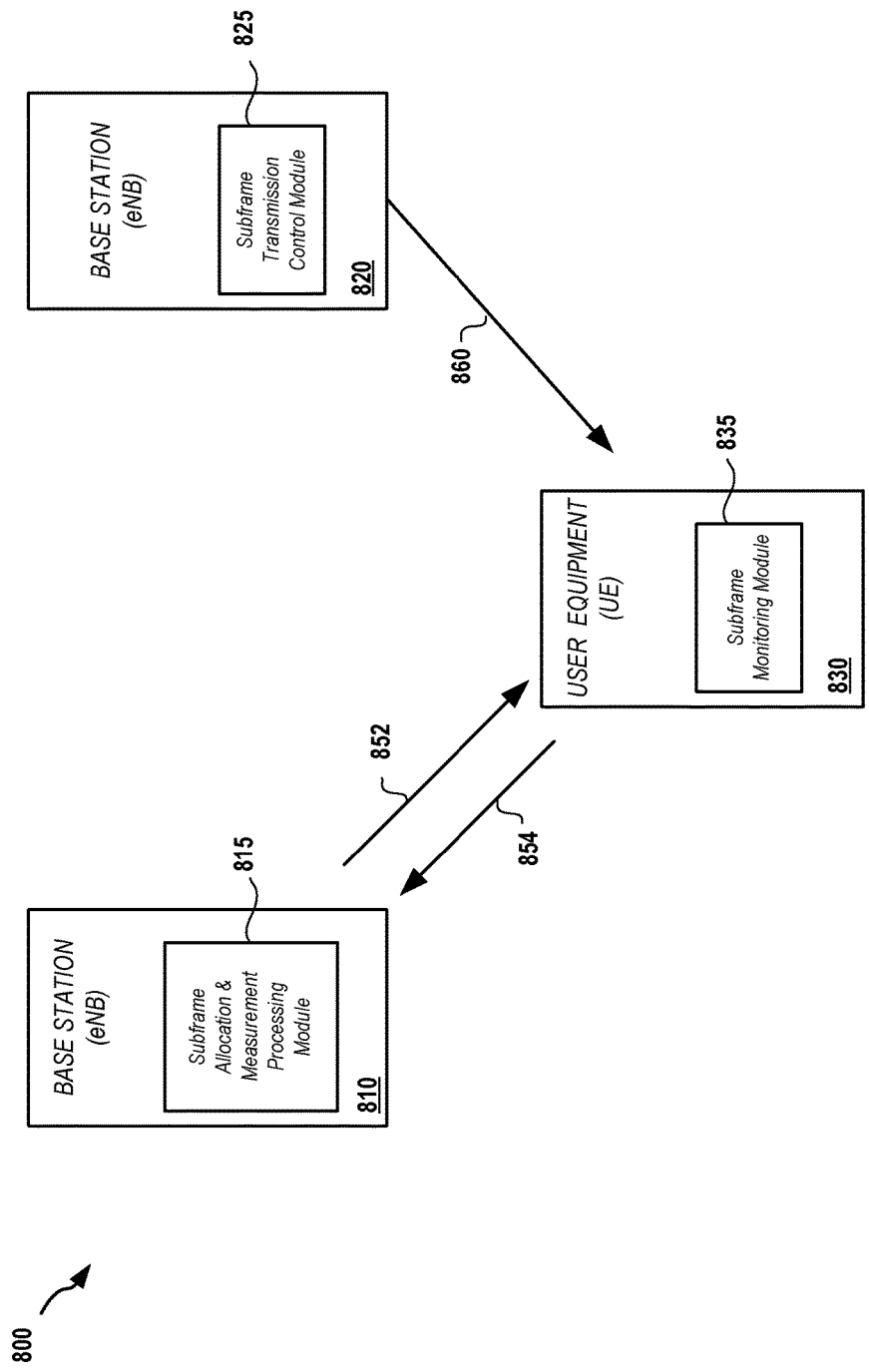
FIG. 8 illustrates an example component configuration in a wireless network configured for subframe interlacing.

FIG. 8 illustrates details of an embodiment of wireless network components 800 that may be used to implement subframe interlace partitioning. Base station (eNB) 810 may be in communication with associated UE 810 via downlink 852 and uplink 854. Another base station (eNB) 820 may be in an adjacent cell and may have coordinated subframe interlacing with eNB 810, such as is shown in FIG. 7. A semi-static subframe may be assigned to eNB 810, which then communicates the subframe to UE 830. Alternately and/or in addition, a dynamic subframe or subframes may also be allocated between eNBs 810 and 820.

During the semi-static subframe, eNB 820 may refrain from transmitting during the semi-static subframe, with UE 830 performing monitoring or other functions during the semi-static subframe. The monitoring may be based on transmission on a DL 860 from eNB 820. Transmission from eNB during the semi-static subframe assigned to eNB 810 may be controlled in a subframe transmission control module 825. Likewise, subframe allocation may be implemented in eNB 810 in module 815 and/or in communication between eNB 810 and eNB 820 and/or in a core network module (not shown). After performing monitoring functionality, which may be done in UE 830 in a subframe monitoring module 835, parameters determined at UE 830 may then be transmitted to eNB 810. For example, measurements of RSRP, RSRQ, and/or other common reference signal (CRS) metrics may be performed in UE 830 during the semi-static interval. These measurements may be associated with radio link monitoring (RLM) measurements and processing, and declaration of radio link failure (RLF). For example, RLF declaration may be based on measurements made during the semi-static subframe rather than in other subframes that could be subject to additional interference. In general, the network should have a freedom in configuring resources (such as, subframes or anything else allowed by the standard) to which the UE will restrict its measurements. One basis for configuring semi-static subframes may be to minimize signaling to the UE.

Radio resource management (RMM) measurements, such as RSRP and RSRQ, as well as other metrics such as channel feedback and/or other metrics, may be done by UE 830, and may be performed in monitoring module 835. In one aspect, the network may configure the UE to utilize semi-statically assigned subframes only, either in whole or in part, thereby restricting the measurements at the UE to a signaled or configured set of resources.

Alternately or in addition, the network may also configure measurements on resources that are not semi-statically assigned. In general, the network may restrict UE measurements to a set of resources where interference characteristics are expected to be similar within the set, but potentially significantly different outside the set. Restricting measurements in this case may allow the UE to report separate measurement quantities to the network, and therefore provide more information about the radio conditions at the UE. In the case of noncolliding common reference signals (CRS), the measurements (e.g., measurements performed on the received CRS) would only account for the interference from the data resource elements and may therefore be significantly dependent on whether the neighboring cell is scheduling data traffic on a given resource (e.g., subframe) or not. In the case of colliding CRS, the measurements would account only for the interference from the neighboring CRS. It is noted that, similarly as RRM measurements, the channel quality measurements (e.g., CQI/PMI/RI) may also be restricted to a set of resources. During initial connection, such as in LTE systems, initial communications between UEs and base stations may be denoted as Msg 1, Msg 2, Msg 3, etc., based on the order of communication. Msg 1 may be initiated from the base station to UEs within the coverage range. In the case of interference from a neighboring cell, an access procedure may include having the eNB transmit Msg 2 in DL allocated subframes and schedule Msg 3 in UL allocated subframes. In particular, Msg 3 may be designed to benefit from HARQ. In order to extend HARQ benefits when subframe partitioning is utilized, the delay bit in Msg 2 may need to be extended to cover all subframe partitioning scenarios (e.g., delays of larger than one subframe may need to be assumed at the UE). This may be done by adding one or two extra bits to enable a four or eight millisecond delay to be signaled to the UE. Alternatively or in addition, a UE can re-interpret the meaning of the one bit (assuming one bit is used). For example, instead of the one bit it representing five or six milliseconds, the extra delay bit represent a different delay value. In one example, the delay bit may be defined so as to not refer to six milliseconds, but rather to the next available known protected subframe. In this scenario, the subframe when Msg 2 is transmitted is known to be protected and repeats every eight ms, and the next available subframe is 12 ms later (e.g, eight milliseconds for the periodicity and four milliseconds for the nominal offset between UL and DL).

Figure 9:
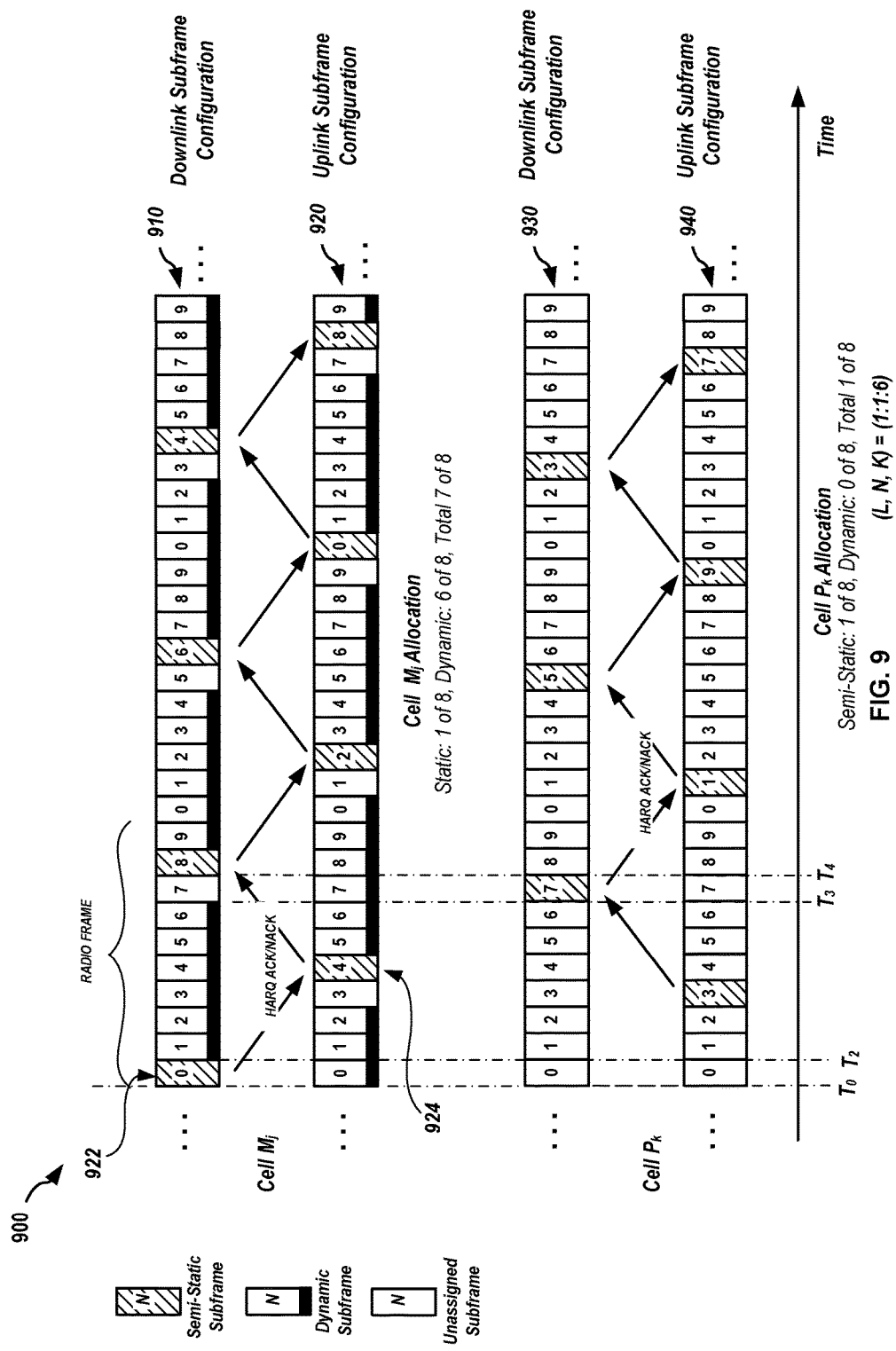
FIG. 9 illustrates an example subframe allocation configuration in a wireless network configured for subframe interlacing.

FIG. 9 illustrates an example embodiment of subframe allocation 900 between a macrocell (denoted as $M_j$) and a picocell (denoted as $P_k$) in a wireless communication system such as shown in 3. It is noted that this particular subframe interlace allocation is provided for purposes of illustration, not limitation, and many other subframe allocations, including those shown subsequently herein, may also be used in various implementations. The subframe allocation may be described by a triplet (L,N,K) where L is the number of semi-static allocations to an eNB of a particular class, such as, for example, Class M defining a macrocell, N is the number of semi-static allocations of a second class, such as, for example, Class P defining a picocell, and K which is the number of available dynamic subframe partitions. Where a subframe allocation equals 8, such as, for example, to facilitate HARQ, K equals 8-L-N.

Timing diagram 910 illustrates subframe allocations assigned to the downlink of Cell $M_j$ and diagram 920 illustrates the corresponding uplink. Likewise, diagrams 930 and 940 correspond to DL and UL for picocell $P_k$. In this example (L,N,K)=(1,1,6). Hybrid Automatic Repeat Request (HARQ) may be used in the wireless communication system. Using HARQ as defined in one implementation in LTE, responses are defined as occurring in 4 subframe intervals. For example, as shown in Cell Mj, a DL transmission at subframe 0 (shown as subframe 922), would expect a response in an ACK/NACK transmission in subframe 4 (shown as 924). This cycle repeats periodically as shown in FIG. 9.

Subframe allocation may be done so that a semi-static subframe assignment from a first cell, such as macrocell Mj, has a corresponding unassigned slot in the adjacent picocell $P_k$. For example, in subframe 0, subframe 922 may be semi-statically assigned to cell $M_j$, and correspondingly unassigned in cell $P_k$. During this subframe, between times $T_0$ and $T_1$, a UE in cell $M_j$ may perform monitoring functions such as described herein. Likewise, if subframe 4 (shown as subframe 924) is assigned to cell $P_k$, the subframe may be unassigned in cell Mj, as shown between time $T_3$ and $T_4$.

In addition, as shown in FIG. 9, subframes may be dynamically allocated to either cell. In this case, 6 subframes have been dynamically allocated to cell Mj, while none have been allocated to cell Pk. Dynamic allocation may be based on particular traffic requirements associated with the particular cells, cell types and/or or power level, or other related parameters. In general, dynamic allocation may be done in conjunction with a core network, such as core network 708 of FIG. 7. Dynamic allocation may vary during operation based on loading, interference level, power level, or other operational parameters.

Semi-static allocation may typically be done to a limited number of subframes. For example, in one implementation, only a few subframes in each cell may be semi-statically allocated. Moreover, in implementations having relatively low traffic, such as cell Pk shown in FIG. 9, allocations may only include a single semi-static subframe for DL and/or UL.

Figure 10:
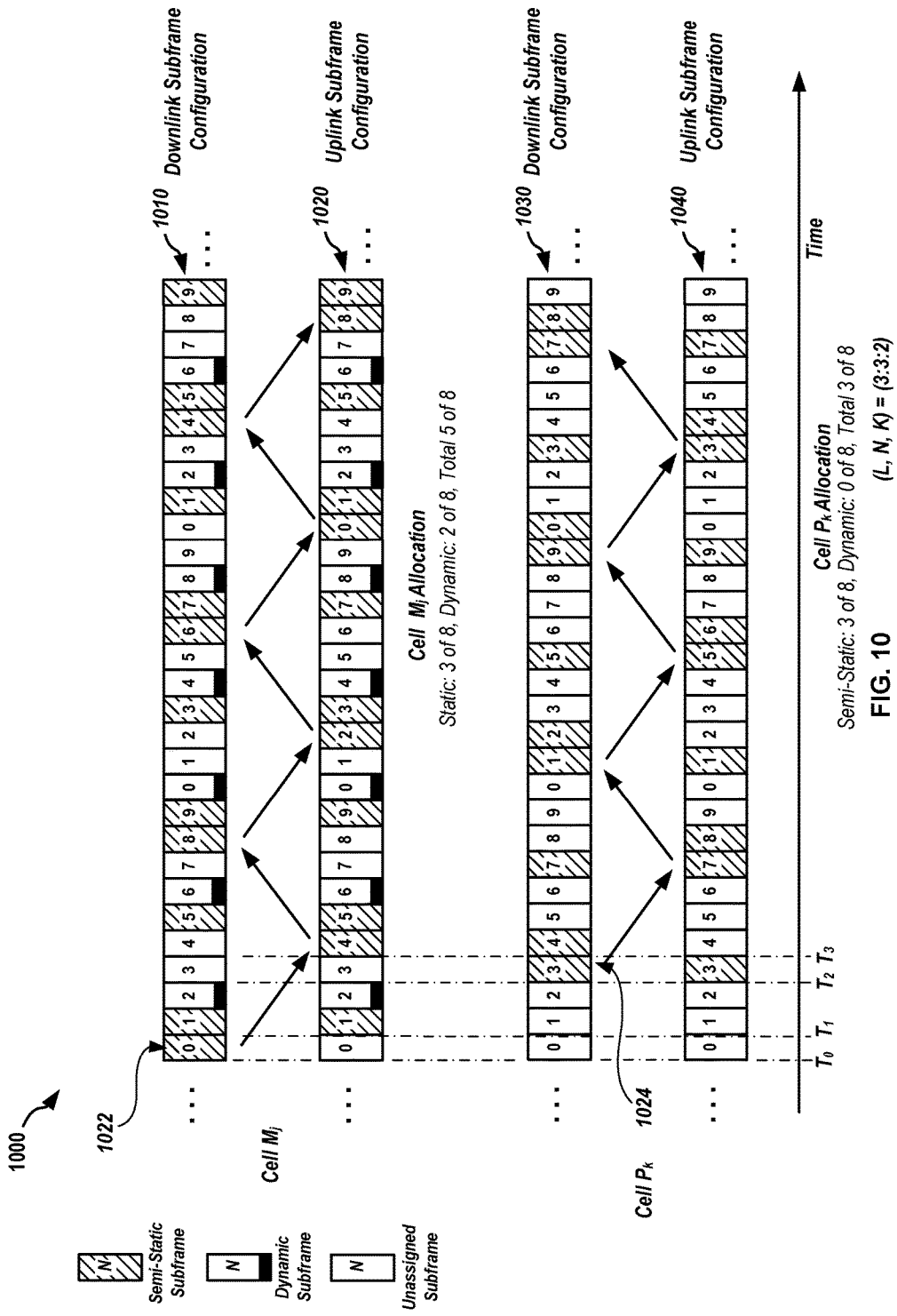
FIG. 10 illustrates another example subframe allocation configuration in a wireless network configured for subframe interlacing.

FIG. 10 illustrates another example subframe partition allocation 1000, in this cased having a triplet (L,N,K) equal to (3:3:2). In this example, multiple subframes may be allocated to cell Mj and cell Pj as shown. In this case, at least one semi-static allocation will have a corresponding unassigned subframe allocated in the other cell. For example, subframe 0 (shown as 1022) may be semi-statically allocated to cell Mj, with a corresponding unallocated subframe in cell Pk. Likewise, subframe 3 (shown as 1024) may be semi-statically allocated to cell Pk, with corresponding unallocated subframes in cell Mj. During these time intervals (e.g., between T0 and T1 and T2 and T3) UEs in corresponding cells may perform measurements such as described herein.

FIGS. 11 to 15 illustrate additional examples of subframe interlace allocations 1100, 1200, 1300, 1400, and 1500 and associated semi-static and dynamically assigned subframes.

Figure 11:
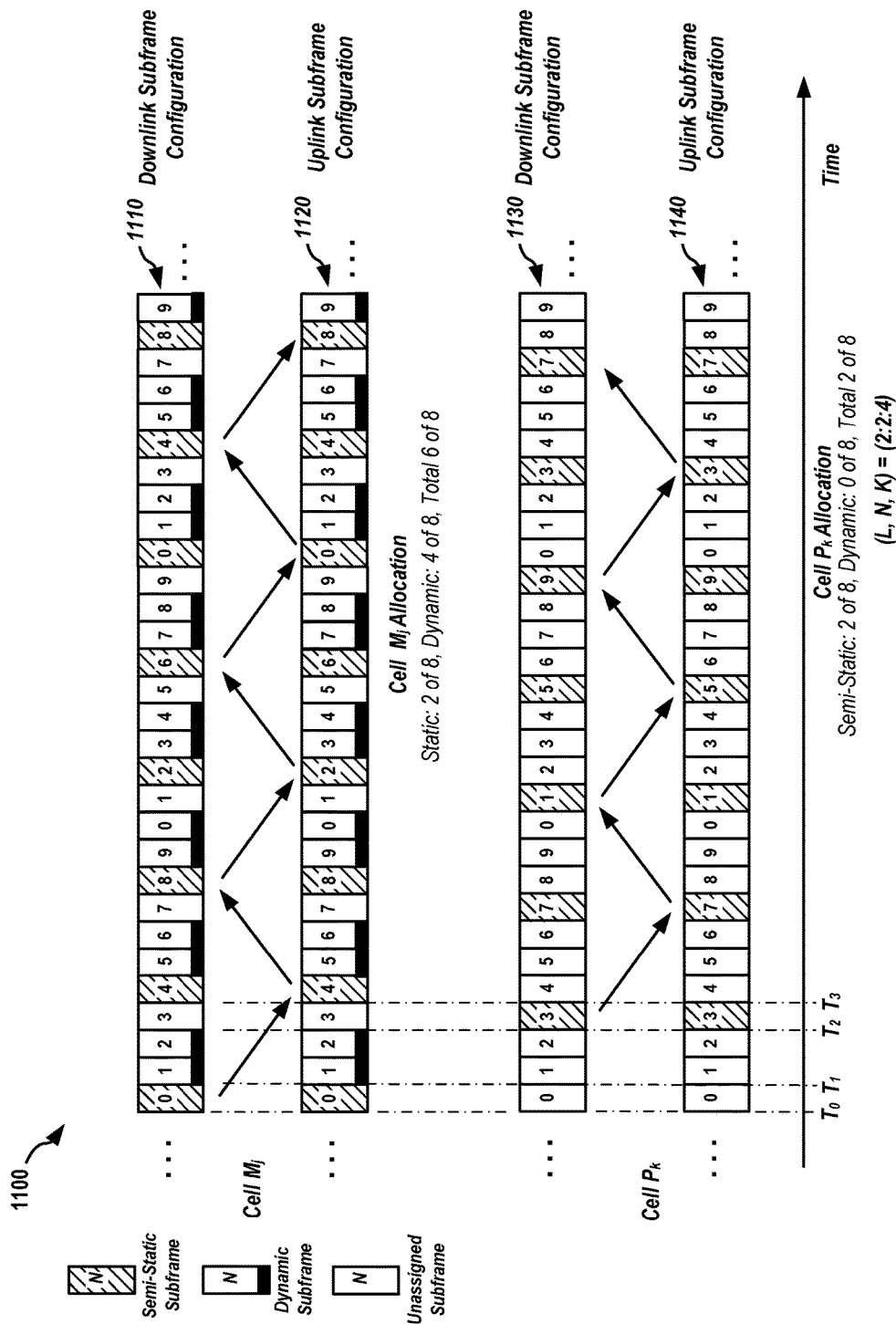
FIG. 11 illustrates another example subframe allocation configuration in a wireless network configured for subframe interlacing.

FIG. 11 illustrates an example allocation 1100 where subframes are dynamically allocated to both cells Mj and Pk with (L, N, K) value of (2:2:4). Timing diagram 1110 illustrates a downlink subframe configuration for cell Mj, which may be a macrocell, and timing diagram 1120 illustrates the corresponding uplink configuration. Likewise, timing diagram 1130 illustrates a downlink subframe configuration for cell Pk, which may be a picocell, while timing diagram 1140 illustrates the corresponding uplink configuration.

Figure 12:
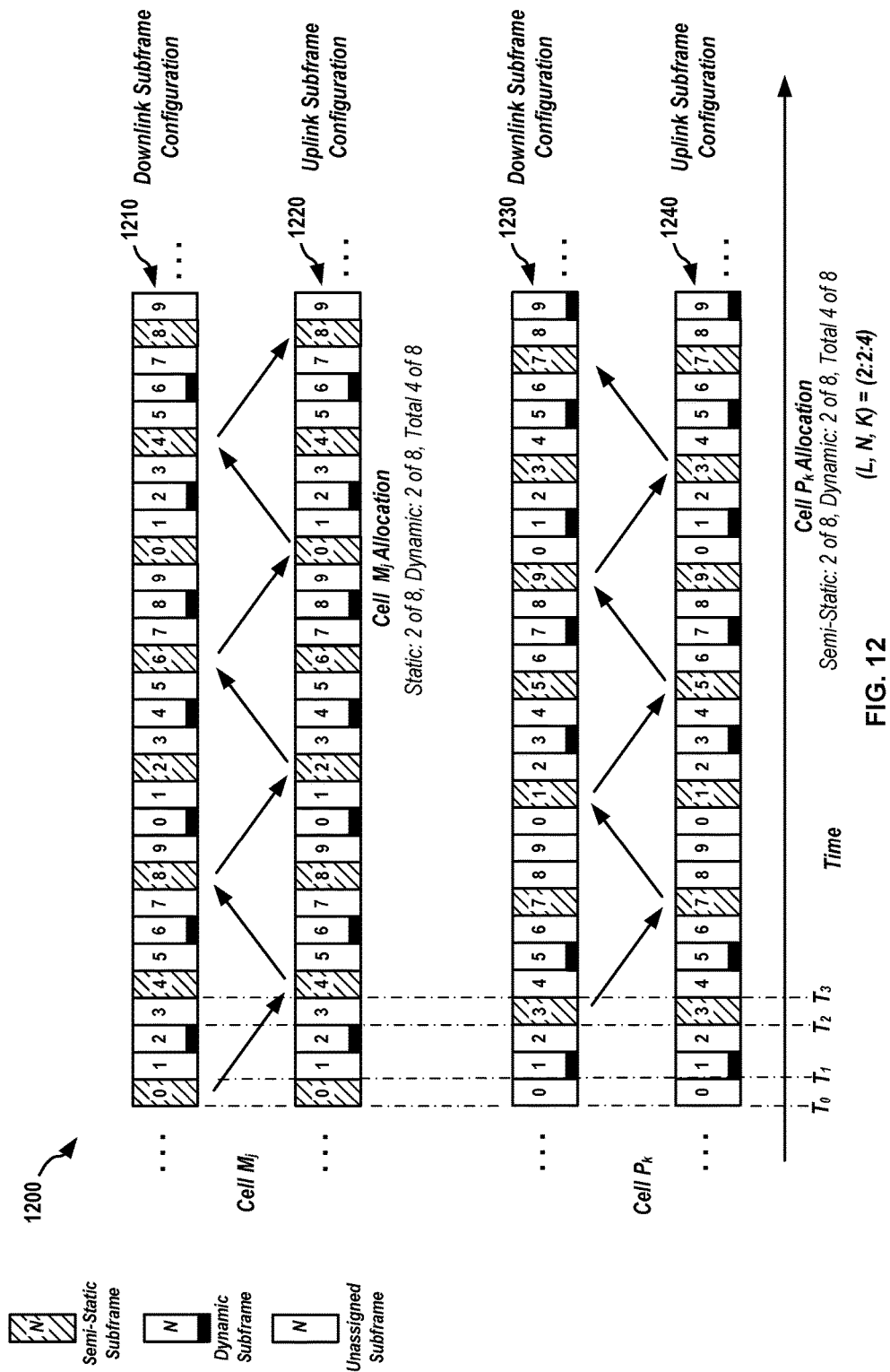
FIG. 12 illustrates another example subframe allocation configuration in a wireless network configured for subframe interlacing.

FIG. 12 illustrates an example allocation 1200 where subframes are dynamically allocated to both cells Mj and Pk with (L,N,K) values of (2:2:4). Timing diagram 1210 illustrates a downlink subframe configuration for cell Mj, which may be a macrocell, and timing diagram 1220 illustrates the corresponding uplink configuration. Likewise, timing diagram 1230 illustrates a downlink subframe configuration for cell Pk, which may be a picocell, while timing diagram 1240 illustrates the corresponding uplink configuration. The allocations shown in the example of FIG. 14 may be determined by, for example, coordination among the two cells and associated base stations, which may further include coordination with a core or backhaul network, such as is described elsewhere here.

Figure 13:
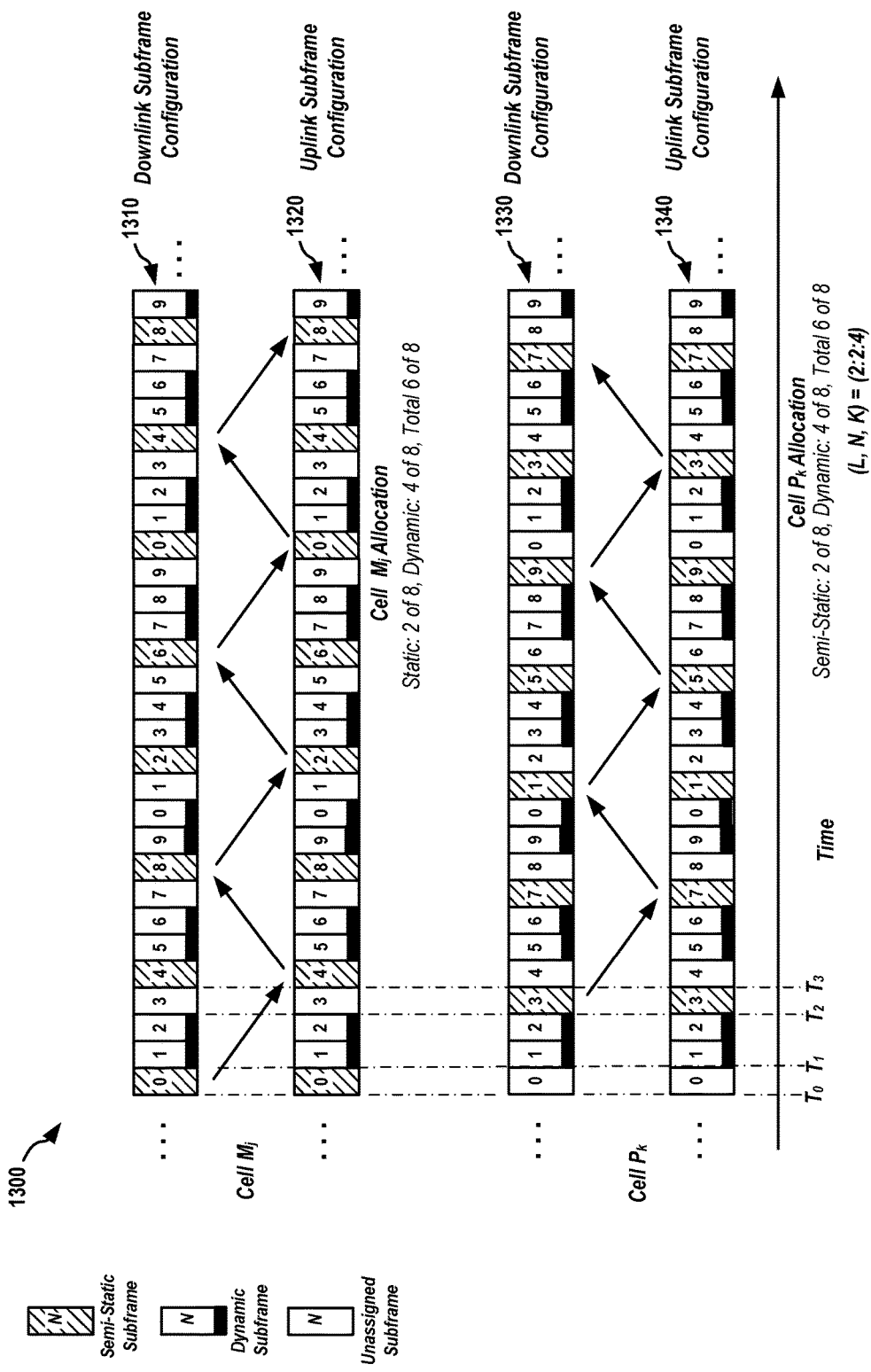
FIG. 13 illustrates another example subframe allocation configuration in a wireless network configured for subframe interlacing.

FIG. 13 illustrates an example allocation 1300 where subframes are dynamically allocated to both cells Mj and Pk with (L,N,K) values of (2:2:4). Timing diagram 1310 illustrates a downlink subframe configuration for cell Mj, which may be a macrocell, timing diagram 1320 illustrates the corresponding uplink configuration. Likewise, timing diagram 1330 illustrates the downlink subframe configuration for cell Pk, while timing diagram 1340 illustrates the corresponding uplink configuration. The allocations shown in the example of FIG. 14 may be determined by, for example, coordination among the two cells and associated base stations, which may further include coordination with a core or backhaul network, such as is described elsewhere here.

Figure 14:
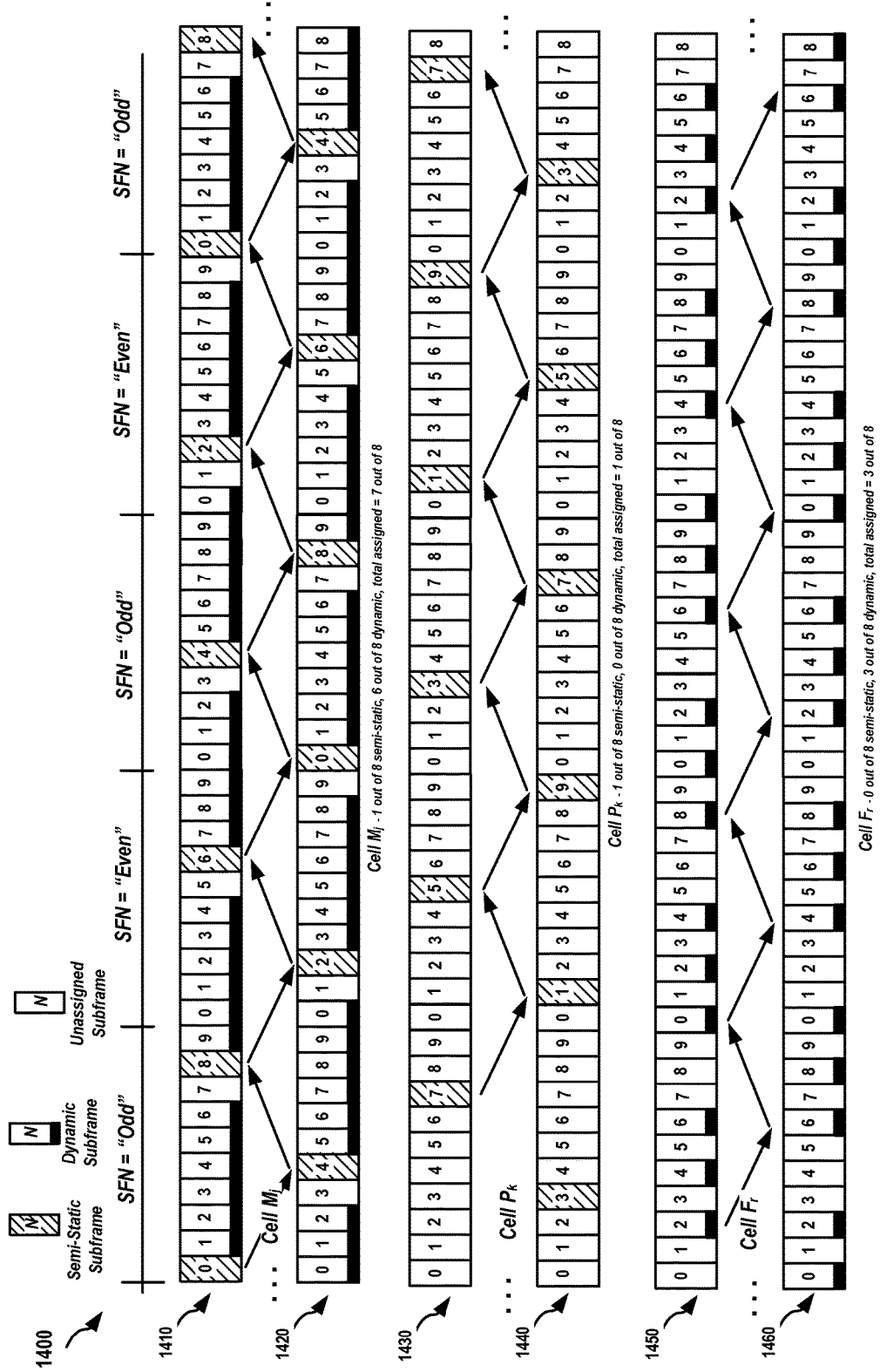
FIG. 14 illustrates another example subframe allocation configuration in a wireless network configured for subframe interlacing.
Figure 15:
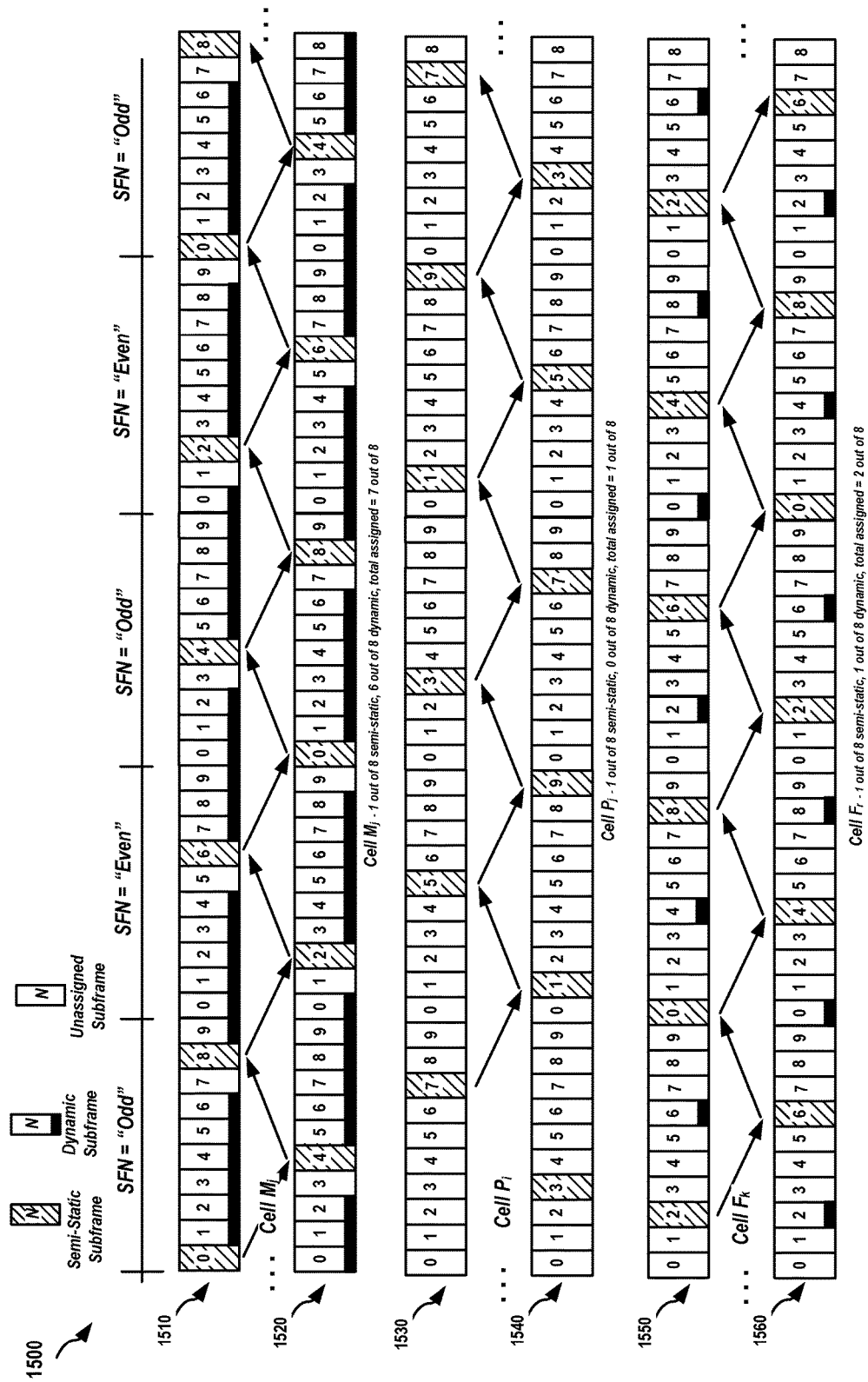
FIG. 15 illustrates another example subframe allocation configuration in a wireless network configured for subframe interlacing.

FIG. 14 illustrates an example allocation 1400 where subframes are dynamically allocated between three cells, Mj, Pk, and Fr. Timing diagram 1410 illustrates a downlink subframe configuration for cell Mj, which may be a macrocell and timing diagram 1420 illustrates the corresponding uplink configuration. Likewise, timing diagram 1430 illustrates a downlink subframe configuration for cell Pk, which may be a picocell, while timing diagram 1440 illustrates the corresponding uplink configuration. In addition, timing diagram 1450 illustrates a downlink subframe configuration for cell Fr, which may be a femtocell, and timing diagram 1460 illustrates a corresponding uplink configuration. The allocations shown in the example of FIG. 14 may be determined by, for example, coordination among the three cells and associated base stations, which may further include coordination with a core or backhaul network, such as is described elsewhere here.

FIG. 14 illustrates another example allocation 1500 where subframes are dynamically allocated between three cells, Mj, Pk, and Fr. Timing diagram 1510 illustrates a downlink subframe configuration for cell Mj, which may be a macrocell and timing diagram 1520 illustrates the corresponding uplink configuration. Likewise, timing diagram 1530 illustrates a downlink subframe configuration for cell Pk, which may be a picocell, while timing diagram 1540 illustrates the corresponding uplink configuration. In addition, timing diagram 1550 illustrates a downlink subframe configuration for cell Fr, which may be a femtocell, and timing diagram 1560 illustrates a corresponding uplink configuration. The allocations shown in the example of FIG. 15 may be determined by, for example, coordination among the three cells and associated base stations, which may further include coordination with a core or backhaul network, such as is described elsewhere here.

Potential Impacts on Subframe Structure—In some implementations, use of subframe interlacing may be done such that no change in transmission format is needed for signals including PSS/SSS, PBCH, RS, and SIB1. PSS and SSS are transmitted in subframe 0 and 5. PBCH is transmitted in subframe 5 of even radio frames. SIB-1 is transmitted in subframe 5 of even radio frames. A reference signal (e.g., CRS) may be transmitted in every subframe. For subframe interlaces assigned to an eNB (either semi-statically or dynamically) the same considerations apply. For subframe interlaces not assigned to an eNB, PDCCH, PHICH, and PCFICH may not be transmitted, and PDSCH may not be scheduled (unless SIB-1 is scheduled). PUSCH may not be scheduled, PUCCH may not be configured (unless legacy Release 8 UE is assigned to transmit CQI/PMI and RI). PRACH and SRS may not be configured.

Figure 16:
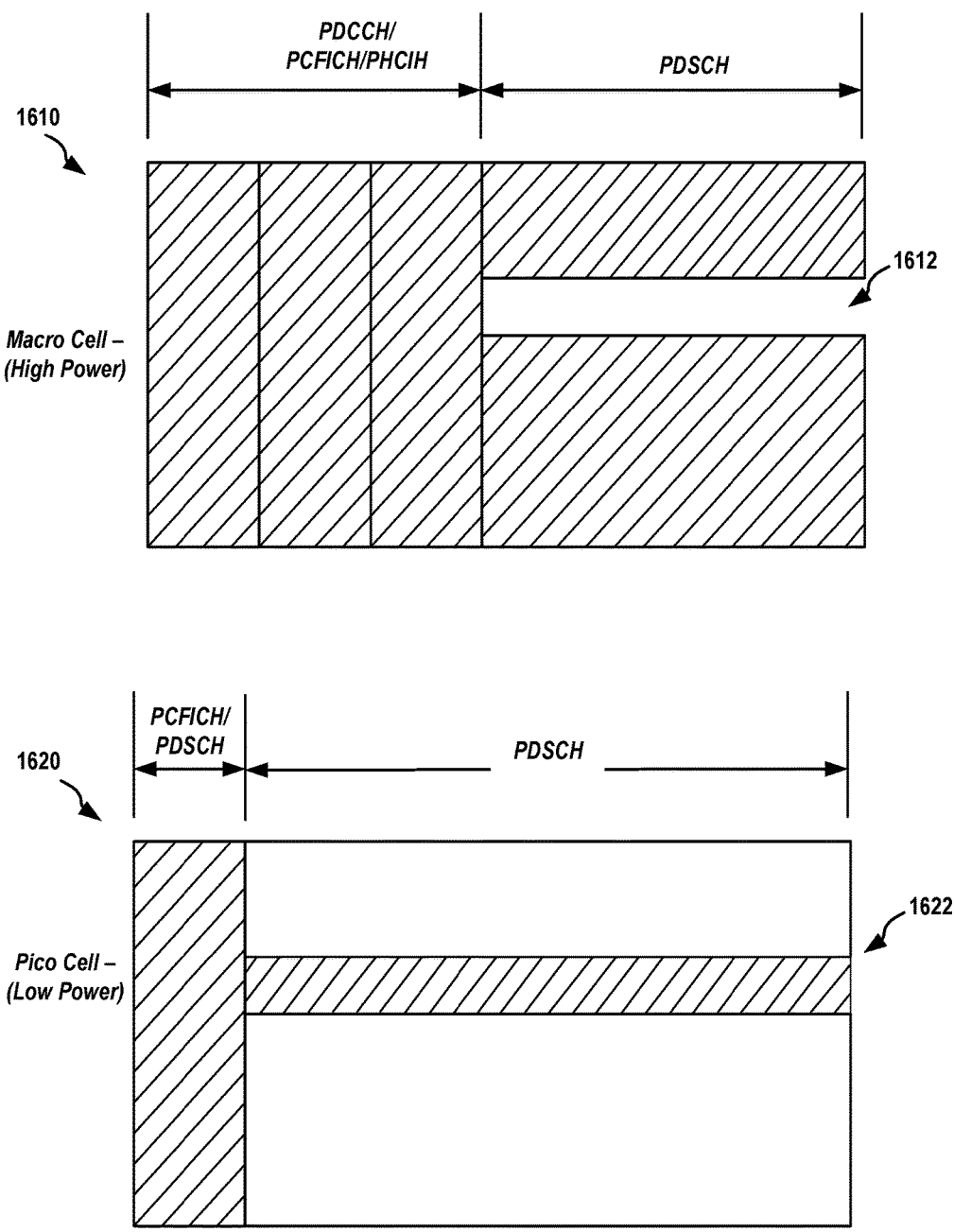
FIG. 16 illustrates one example of subframe assignment between a macrocell and picocell.

In some implementations, certain allocations may be adjusted so as to protect, for example, particular channels of importance. An example of this is illustrated in FIG. 16, where a macrocell, which may be a high power cell, is operating in proximity to a picocell, which may be a low power cell. It may be important to protect certain resources, such as are shown in FIG. 16. For example, resources 1612 (in subframe 5) may be assigned to the macrocell. PCFICH, PDCCH and/or other resources may be semi persistently scheduled, which may be done using SIB-1. This may included using dedicated signaling for UEs in RRC_Connected mode only. In addition, some resources 1612, such as the physical downlink shared channel (PDSCH) may be protected, such as by resource orthogonalization, and/or interference cancellation. This may allow the picocell to use these resources 1622, as shown in resource diagram 1620, without interference from the macrocell.

Figure 17:
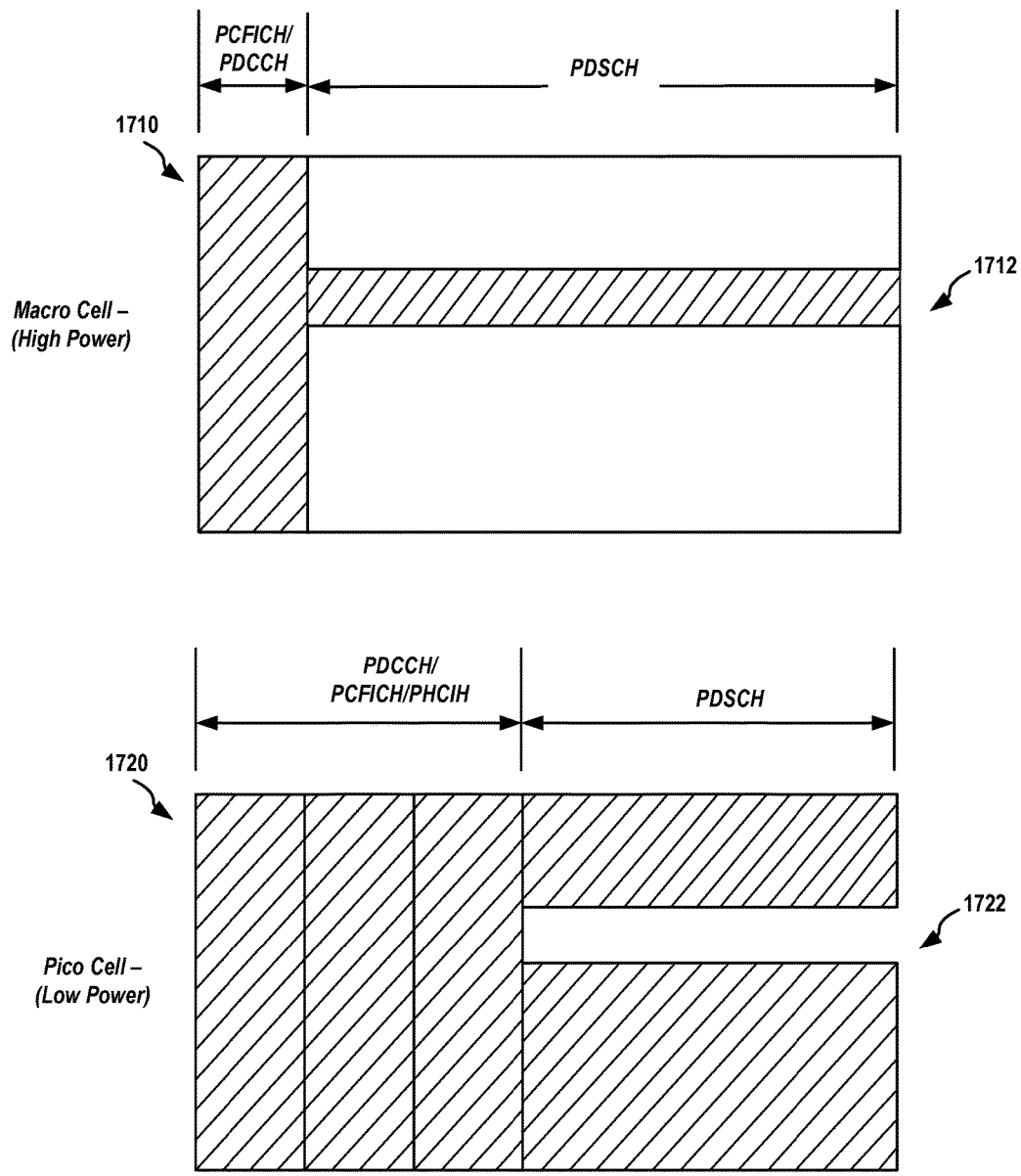
FIG. 17 illustrates one example of subframe assignment between a macrocell and picocell.

FIG. 17 illustrates another example of resource protection. In this example, certain resources may be protected for a macrocell. For example, interference may be from SIB-1 and/or page transmissions. The subframe and page occasions may be assigned to a picocell (or other lower power cell). SIB-1 and/or page interference cancellation may be used, as well as PCFICH/PDCCH interference cancellation. If, for example, the dominant interference on assigned subframes from SIB-1 and page transmissions cannot be cancelled (e.g., if they are in the control channel region only), retransmissions on this interface (e.g., the subframe 8 mS earlier) may request scheduling of retransmission on this subframe. In order to facilitate this, resources 1722 may be excluded from the picocell, such as is shown in resource diagram 1720. These may be within the PDSCH. Similarly, resources 1712 may be allocated to the macrocell as shown in resource diagram 1710.

Potential Impacts on RRM—Semi-static subframe partitioning will typically be done at a core or backhaul network as an OA&M-based operation. This approach may account for targeted performance of physical layer control procedures. Dynamic subframe partitioning may be based on a quality of service (QoS) metric of UE bearers associated with a cell. This may account for physical resource block (PRB) utilization and the amount of data a UE is transmitting and receiving.

The downlink radio link failure monitoring (RLM) procedure may be based on a semi-statically configured subframe. Because the UE will be notified in advance of semi-static subframes, it can make assumptions about channel characteristics during these subframes. The UE will generally not be able to make assumptions about dynamically allocated subframes.

Uplink RLM procedure supervision may be based on semi-static and/or dynamically configured subframes.

X2 control (X2-C) signaling is generally not required for semi-static subframe partitioning, however, it may be used in some implementations. Signaling for dynamic subframe partitioning may be done using a handshake procedure between eNBs. These may be eNBs interfering with each other, that may belong to different classes. Examples of handshaking procedures are further illustrated in FIGS. 18-20.

Figure 18:
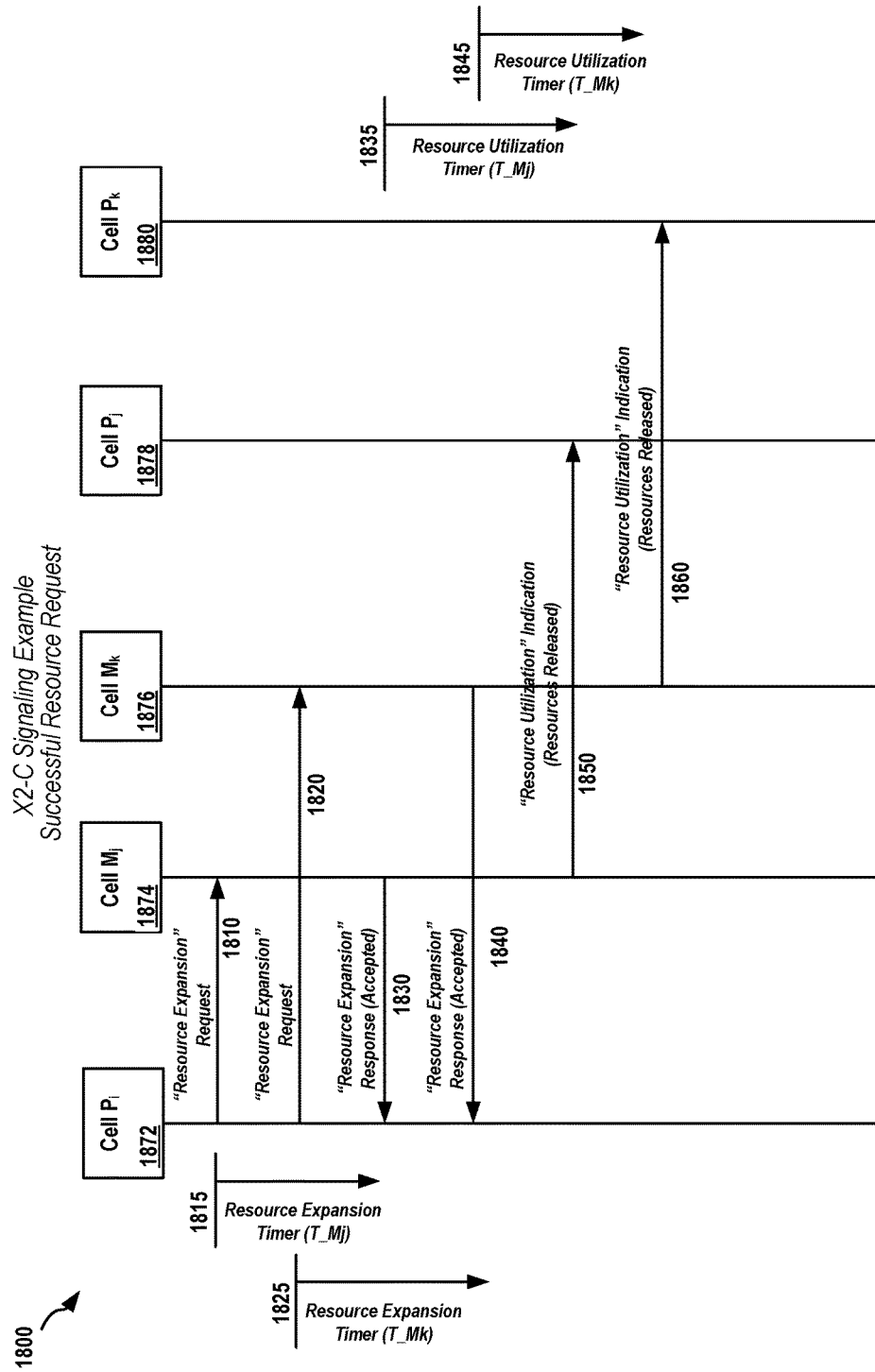
FIG. 18 illustrates an X2-C (control) signaling example for successful resource request between multiple cells in a wireless network.

FIG. 18 illustrates details of example signal flow 1800 using X2 control (X2-C) signaling, for a fully successful resource expansion request between three cells and associated nodes, such as eNBs. Signaling may be provided, for example, between wireless network nodes in cells 1872, 1874, 1876, 1878, and 1880, such as is shown in FIG. 18. The cells designated as P may be picocells, and the cells designated as M may be macrocells. Alternately, other cell types and/or power levels may communicate in a similar fashion. A resource expansion request 1810 may be sent from cell 1872 to cell 1874. Alternately or in addition, another resource expansion request 1820 may be sent from cell 1872 to cell 1876. Cells 1874 and 1876 may be macrocells operating adjacent to cell 1872, which may be a picocell or other lower power cell. Response timing may be governed by a resource expansion timer, which may be initialized at times 1815 and 1825, corresponding to requests 1810 and 1820. In this case, cells 1874 and 1876 may both accept the resource expansion request in full, such as is shown with acceptances 1830 and 1840, before a timeout. In addition, cells 1874 and 1876 may signal other cells, such as cells 1878, regarding the resource request and associated resource adjustments. For example, cells 1878 and 1880 may be provided with a resource utilization indications 1850 and 1860, which may indicate with resources have been adjusted with respect to cells 1872 and 1874, so that these resources may be utilized by cells 1878 and 1880, and/or for other signaling or control purposes. For example, cell 1874 may signal adjacent or neighboring cell 1878, while cell 1876 may signal adjacent or neighboring cell 1880. Resource utilization timers 1835 and 1845 may be initiated with the resource expansion acceptances 1830 and 1840.

Figure 19:
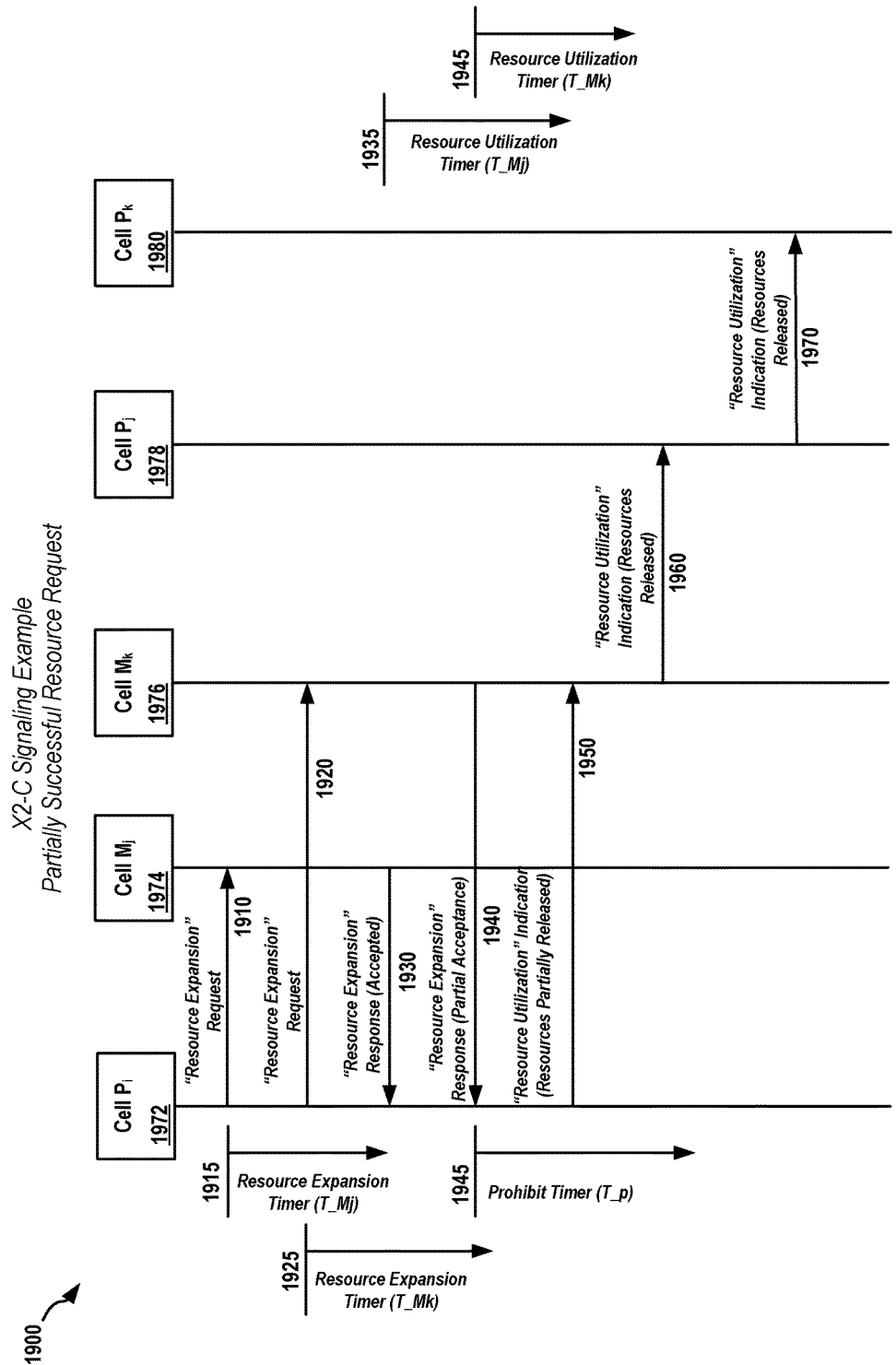
FIG. 19 illustrates an X2-C (control) signaling example for a partially successful resource request between multiple cells in a wireless network.

FIG. 19 illustrates details of another example signal flow 1900 using X2 control (X2-C) signaling, in this case for a partially successful resource request, e.g, wherein resources may be partially, rather than fully, expanded. This may be done between, for example, three cells and associated nodes, such as eNBs. Signaling may be provided, for example, between wireless network nodes in cells 1972, 1974, 1976, 1978, and 1980, such as is shown in FIG. 19. The cells designated as P may be picocells, and the cells designated as M may be macrocells. Alternately, other cell types and/or power levels may communicate in a similar fashion. A resource expansion request 1910 may be sent from cell 1972 to cell 1974. Alternately or in addition, another resource expansion request 1920 request may be sent from cell 1972 to cell 1976. Cells 1974 and 1976 may be macrocells operating adjacent to cell 1972, which may be a picocell or other lower power cell. Response timing may be governed by a resource expansion timer, which may be initialized at times 1915 and 1925, corresponding to requests 1910 and 1920. In this case, cell 1974 may accept the request in full (with acceptance 1930), but cell 1976 may accept the resource expansion request only in part, as shown with partial acceptance and 1940. This may trigger a prohibit timer 1945, which may be used to limit resource use, such as in cell 1972. A response indication 1950 may be provided with respect to the partial release, which may indicate, for example, full, partial, or no acceptance. Based on the response to the expansion requests, cell 1976 may signal acceptance of the partial release, such as via indication 1960. This information may be further provided to other adjacent or neighboring cells, such as via indication 1970. In addition, full expansion may signaled from cell 1974 to cell 1980 (not shown in FIG. 19). Resource utilization timers 1935 and 1945 may be initiated with the resource expansion acceptance and partial acceptance 1930 and 1940.

Figure 20:
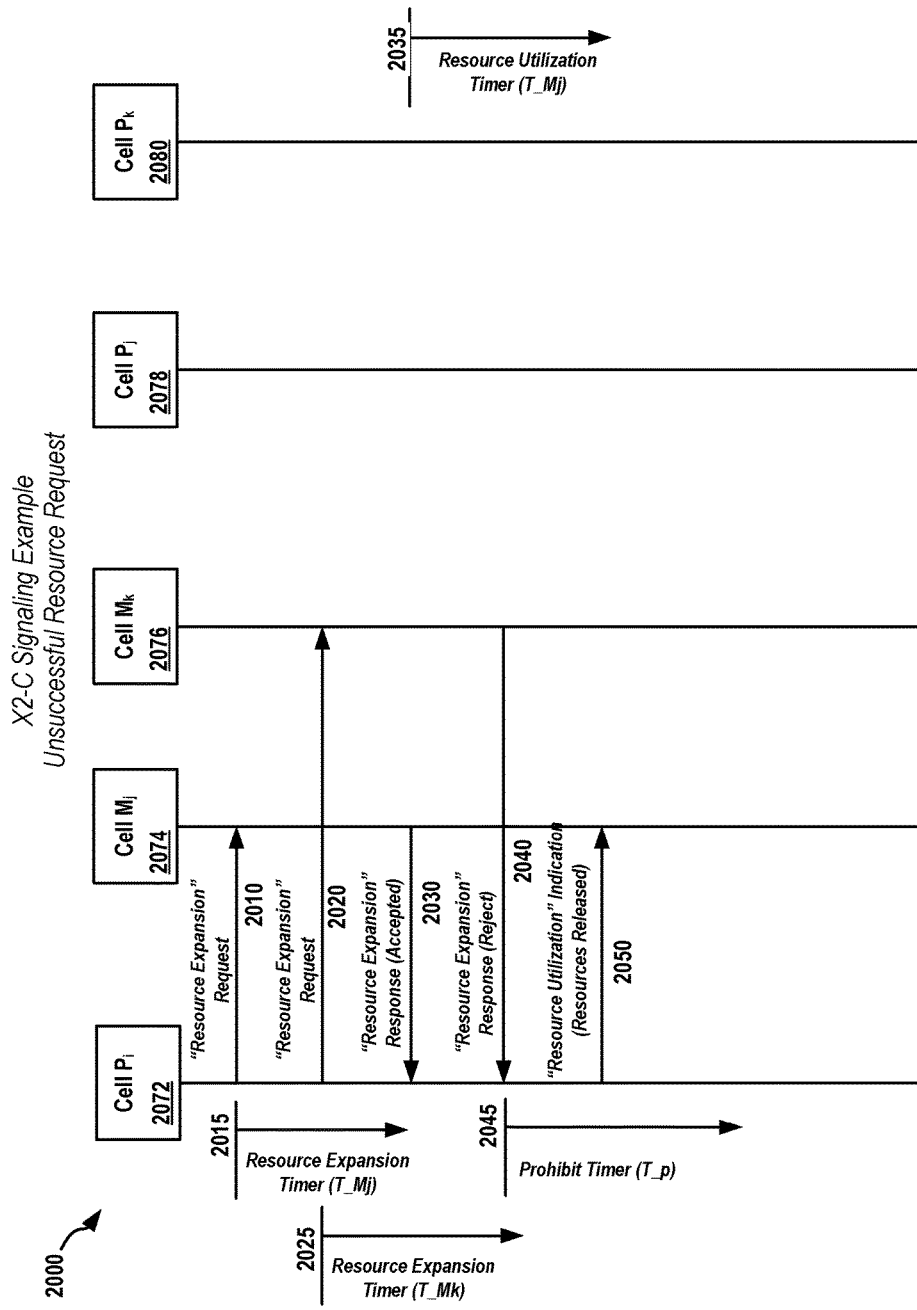
FIG. 20 illustrates an X2-C (control) signaling example for an unsuccessful resource request between multiple cells in a wireless network.

FIG. 20 illustrates details of example signal flow 2000 using X2 control (X2-C) signaling, for a partially unsuccessful resource request between three cells and associated nodes, such as eNBs. Signaling may be provided, for example, between wireless network nodes in cells 2072, 2074, 2076, 2078, and 2080, such as is shown in FIG. 20. The cells designated as P may be picocells, and the cells designated as M may be macrocells. Alternately, other cell types and/or power levels may communicate in a similar fashion. A resource expansion request 2010 may be sent from cell 2072 to cell 2074. Alternately or in addition, another resource expansion request 2020 may be sent from cell 2072 to cell 2076. Cells 2074 and 2076 may be macrocells operating adjacent to cell 2072, which may be a picocell or other lower power cell. Response timing may be governed by a resource expansion timer, which may be initialized at times 2015 and 2025, corresponding to requests 2010 and 2020. In this case, cell 2074 may accept the request, such as via acceptance 2030, while cell 2076 may reject the request. The rejection may be signaled to cell 2072 via a rejection response 2040, which may then initiate a prohibit timer 2045. A resource utilization indication 2050 may be provided from cell 2072 to cell 2074. The acceptance may be further signaled to other cells, such as cells 2078 and 2080 (not shown in FIG. 20). Resource utilization timer 2035 may be initiated with the resource expansion acceptances 2030.

Figure 21:
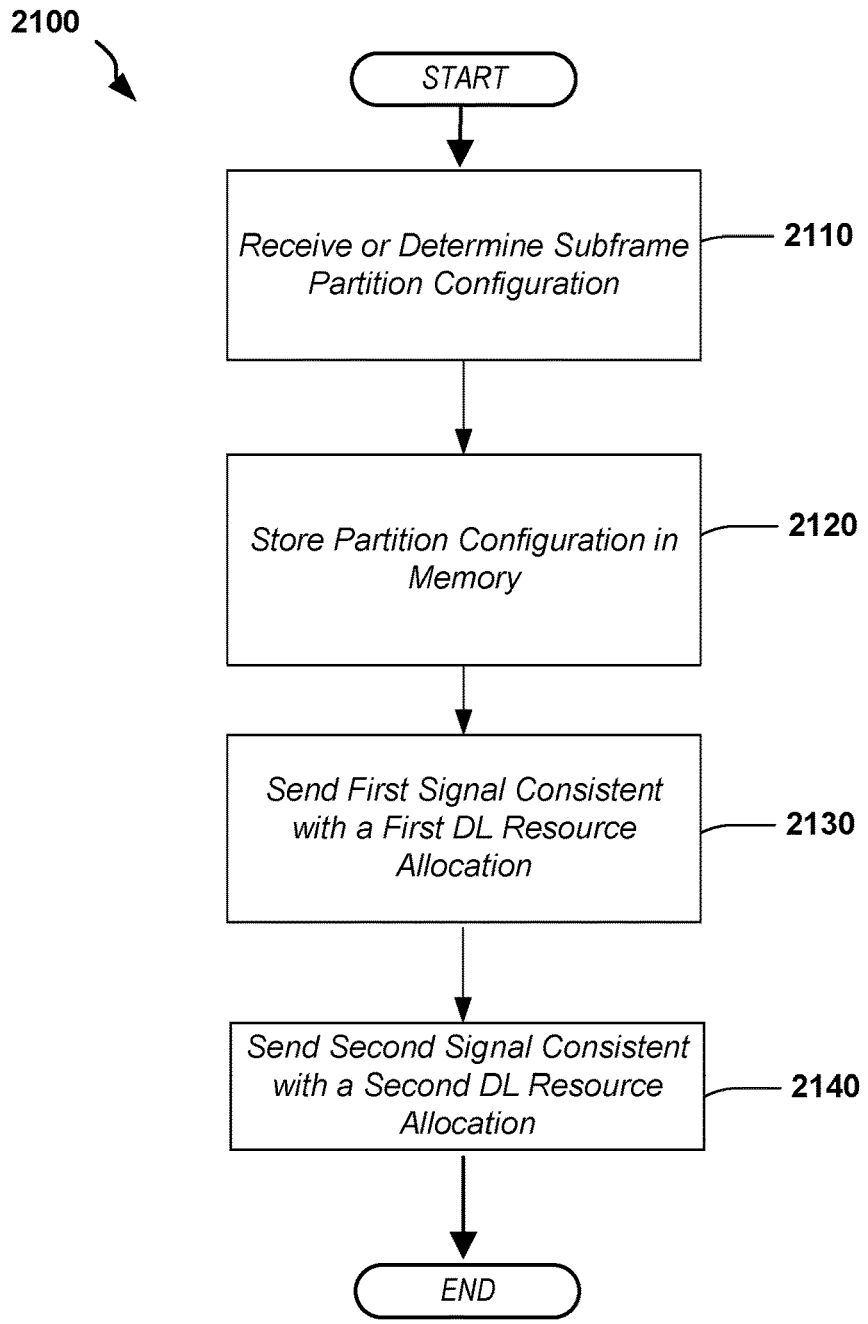
FIG. 21 illustrates an embodiment of a process for subframe interlace operation in a wireless network base station.

FIG. 21 illustrates details of an embodiment of an example process 2100 for providing wireless communications using subframe allocation. At stage 2110, a subframe partition configuration may be received, such as, for example, at a base station, which may be an eNB or HeNB, from, for example, a core network. Alternately, or in addition, the subframe partition may be generated, in whole or in part, in communication with another base station, such as an part, base station in a neighboring or adjacent cell, and/or in conjunction with the core network. At stage 2120, the partition information may be stored, for example, in a memory of the base station. At stage 2130, a first signal may be sent which may be, for example, consistent with a first downlink (DL) resource allocation included in the partition configuration. At stage 2140, a second signal may be sent which may be, for example, consistent with a second downlink (DL) resource allocation included in the partition configuration. The first and second DL resources may be different types. For example, the first DL resource may be a semi-static resource and the second DL resource may be a dynamic resource. In another example, both resources may be the same type.

The first DL resource may be, for example, orthogonal to a second DL resource allocated to a second base station. The first DL resource and the second DL resource may be time-division multiplexed and/or frequency division multiplexed. The subframe partition configuration may further include, for example, an allocation of at least one unassigned resource. The first base station may be, for example, one of a macrocell base station, a femtocell, or picocell base station.

The method may further include, for example, negotiating, with a second base station, a subframe resource allocation configuration and determining, based on the negotiation, the subframe resource allocation. The subframe resource allocation may be stored, for example in a memory. Various embodiments may be in the form of a computer program product, communication device, apparatus, module, or other configuration.

Figure 22:
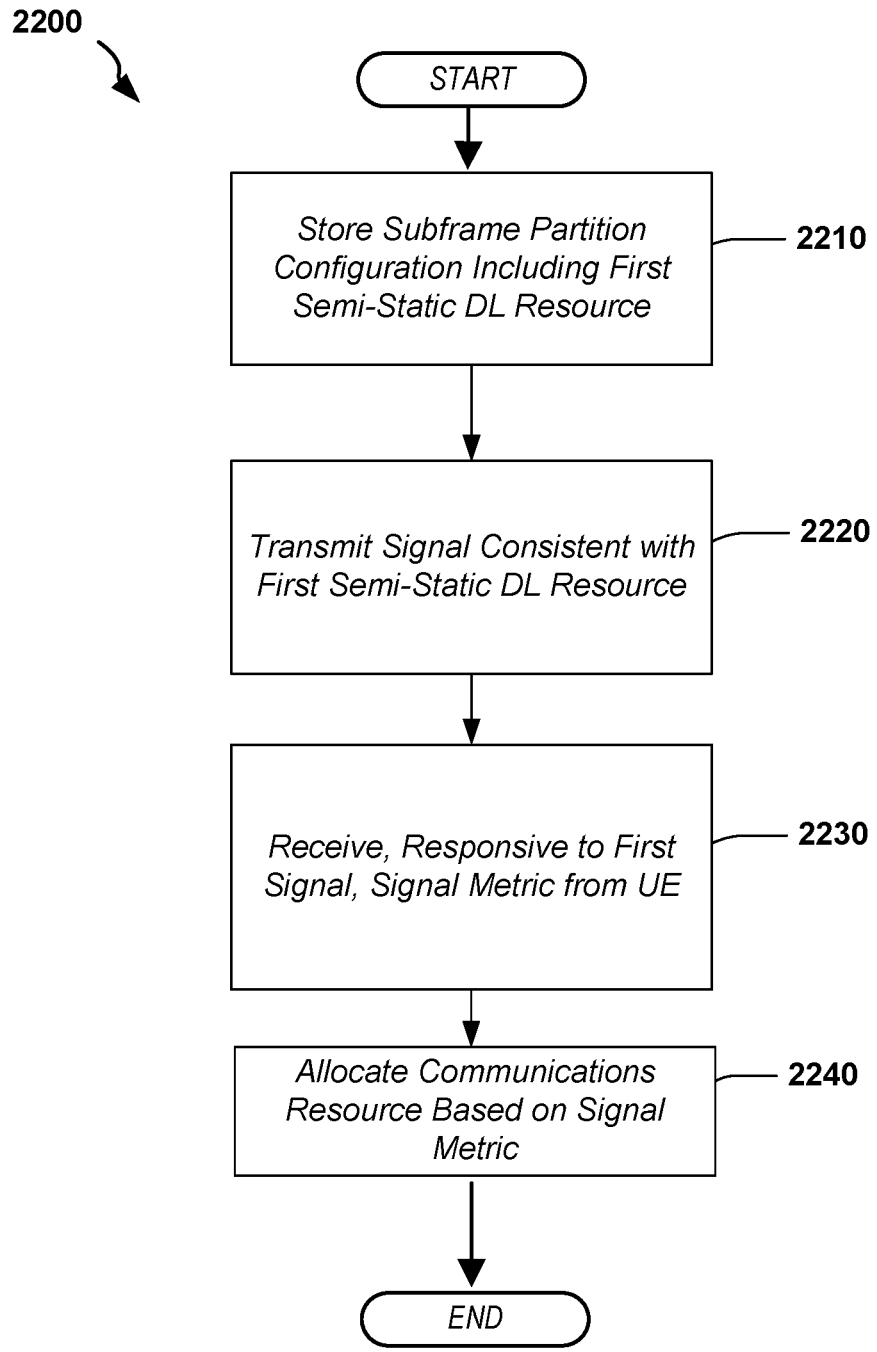
FIG. 22 illustrates an embodiment of a process for subframe interlace operation in a wireless network base station.

FIG. 22 illustrates details of an embodiment of an example process 2200 for providing wireless communications using subframe allocation. At stage 2210, a subframe partition configuration may be received and stored, such as, for example, at a network node, which may be a base station. The allocation may be provided from, for example, a core network. Alternately, or in addition, the subframe partition configuration may be determined, in whole or in part, in the base station, which may be in communication with another base station and/or the core network to facilitate determination of the partition configuration. The base stations may be, for example, eNBs or HeNBs. The subframe partition configuration may include one or more semi-static and/or one or more dynamic configured resources. In an exemplary embodiment, the configuration may include at least a first semi-static resource. At stage 2220, a signal may be transmitted, such as to a UE, consistent with the resource allocation. The signal may be transmitted, for example, consistent with a semi-static resource allocation. At stage 2230, a signal metric may be received from a network node, such as, for example, a UE. At stage 2240, communication system resources may be allocated, which may be done, for example, consistent with the received signal metric.

The first semi-static DL resource may be, for example, orthogonal to a second semi-static DL resource allocated to a second base station. The signal metric may be, for example, an RLM metric, and the RLM metric may be determined during a semi-static subframe. The semi-static subframe may be signaled to the UE prior to the transmitting. The method may further include, for example, allocating the communications resource based at least in part on the signal metric. The communication connection between base stations may be a wireless connection, such as, for example, an X2 connection. Alternately or in addition, the communication connection may be a backhaul connection to one or more core network and/or OA&M functional modules. If a backhaul connection is used, it may include, for example, a S1 connection. The first base station and/or the second base station may be in communication with the core network. The determining may be performed, for example, in conjunction with the core network. Alternately, the determining a configuration may be performed independent of a core network, where the core network may be associated with the first base station and/or the second base station. Various embodiments may be in the form of a computer program product, communication device, apparatus, module, or other configuration.

Figure 23:
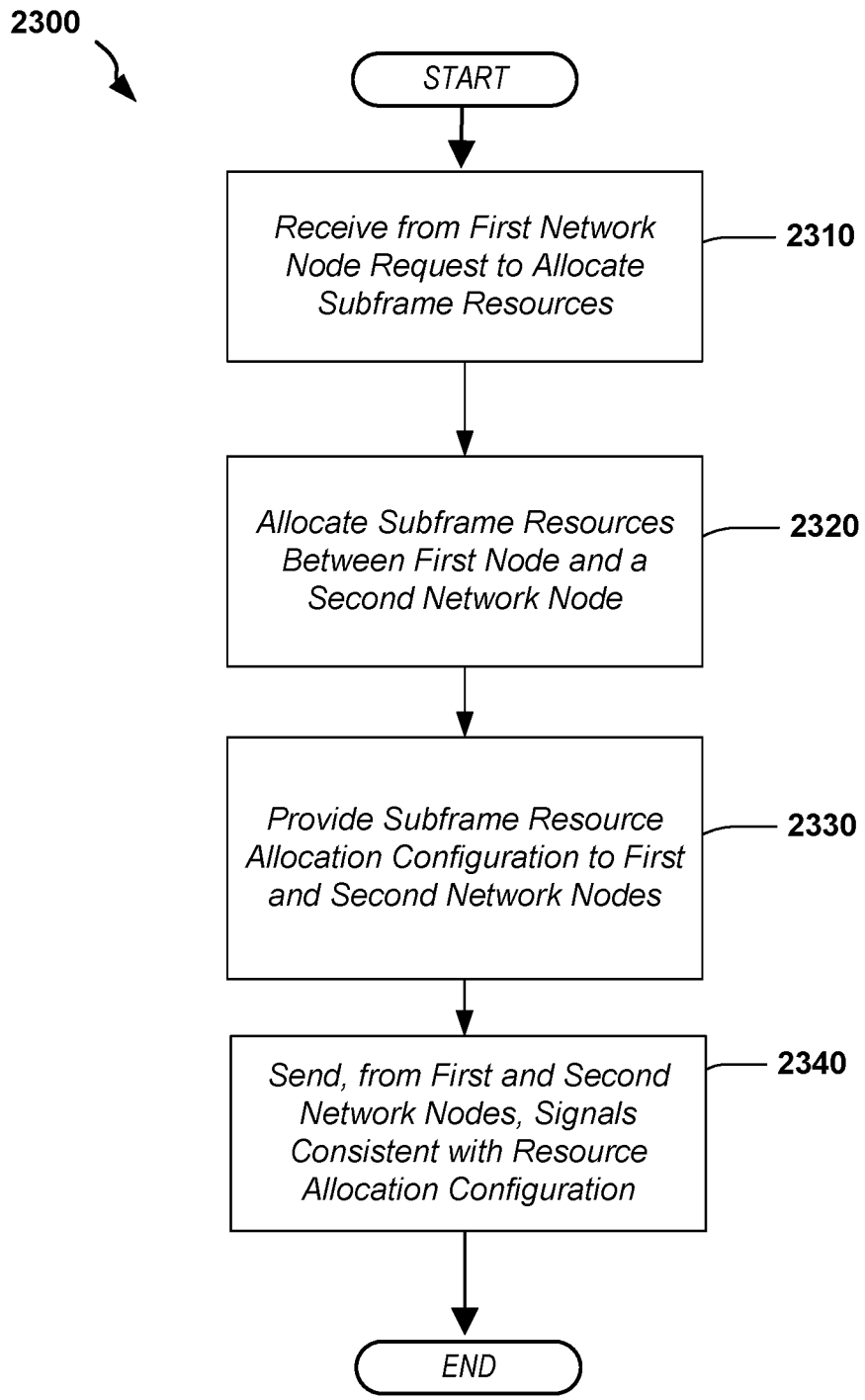
FIG. 23 illustrates an embodiment of a process for interlaced subframe allocation in a wireless network.

FIG. 23 illustrates details of an embodiment of an example process 2300 for providing wireless communications using subframe allocation. At stage 2310, a request to allocate subframe resources may be received from a first network node, such as a base station, which may be, for example, an eNB or HeNB. The request may be generated based on communications between the base station and served UEs, adjacent cells UEs, and/or between base stations, such as in adjacent cells. At stage 2320, subframe resources may be allocated based on the request. The allocation may be, for example, an allocation between the base station and another adjacent base station, which may be associated with an adjacent or neighboring cell. At stage 2330, an allocation configuration may be generated and provided to the first base station. The allocation may also be provided to one or more additional base stations, such as base stations in neighboring or adjacent cells. At stage 2340, signaling may be sent from one or more of the base stations consistent with the resource allocation configuration. The signals may be used, for example, to determine a signal metric for communication system configuration, and/or for other purposes, such as those described elsewhere herein.

The subframe resource configuration may include, for example, a semi-static subframe resource allocation and/or a dynamic subframe resource allocation. Alternately or in addition, the subframe resource configuration may include a non-assigned resource allocation. The subframe resource configuration may include, for example, a first semi-static resource allocation assigned to the first wireless network node and a second semi-static resource allocation assigned to the second wireless network node. The first semi-static resource allocation and the second semi-static resource allocation may be configured to be orthogonal. Various embodiments may be in the form of a computer program product, communication device, apparatus, module, or other configuration.

Figure 24:
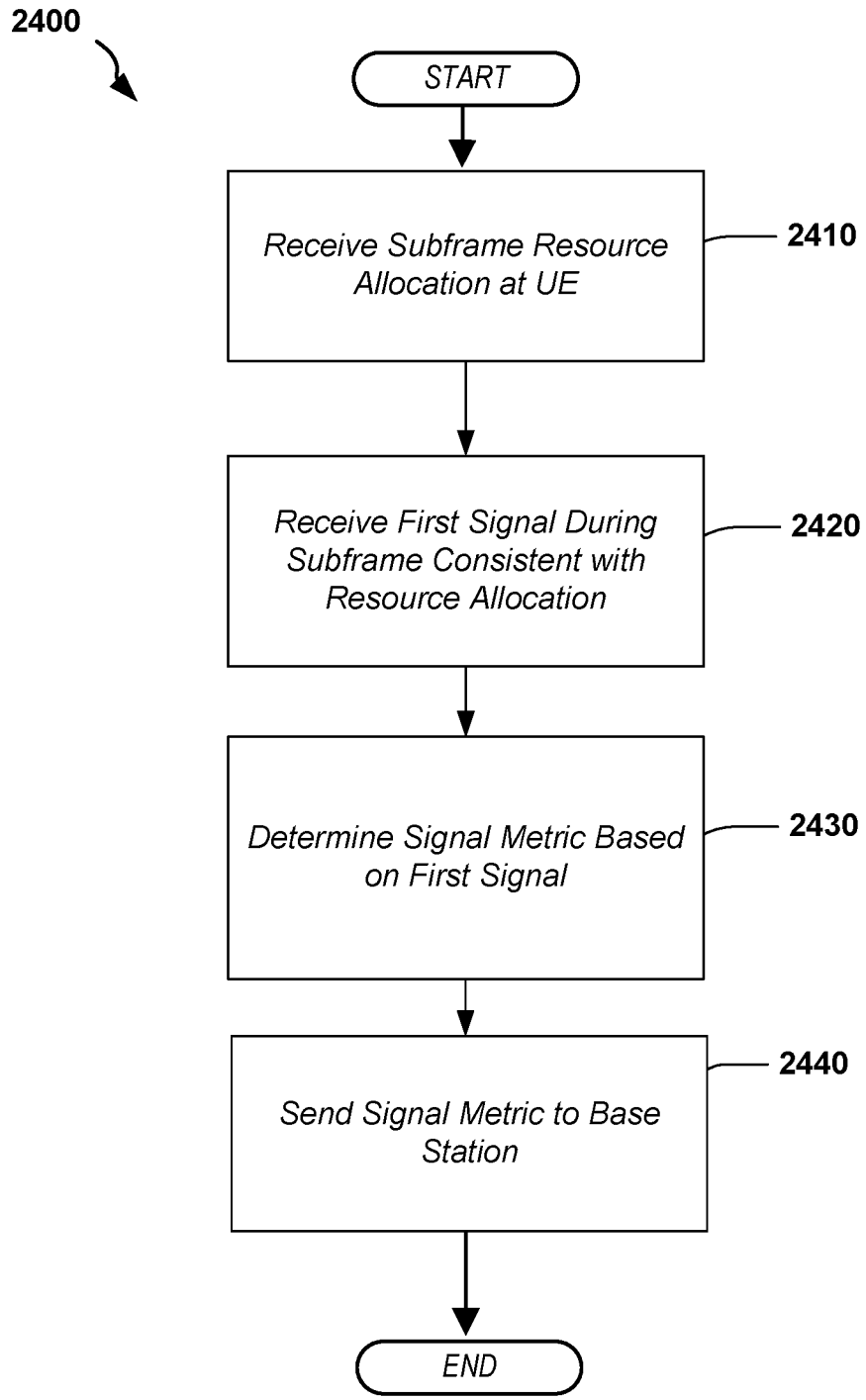
FIG. 24 illustrates an embodiment of a process for signal monitoring in a user equipment (UE) based on a interlaced subframe configuration.

FIG. 24 illustrates details of an embodiment of an example process 2400 for providing wireless communications using subframe allocation. At stage 2410, a communications device, such as a terminal or UE, may receive a subframe resource allocation, such as, for example, from a first base station, which may be an eNB, HeNB or other base station. At stage 2420, a first signal may be received from another base station, during a subframe or portion of a subframe consistent with the resource allocation, which may be, for example, a semi-static resource allocation. At stage 2430, a signal metric may be determined based on the first signal. At stage 2440, the signal metric may be sent to the first base station, where it may be further used communication system configuration or other processing.

The received information may relate to a predetermined subframe resource allocation, which may be, for example, a semi-static or dynamic allocation. The signal metric may be, for example, a Radio Link Monitoring (RLM) metric. The received information may include, for example, Radio Resource Management (RRM) control information. The information may also include channel feedback information and/or channel quality indication (CQI) information. The first base station may be associated with a first cell and the first signal may be transmitted from a node, such as a base station, which may be an eNB, HeNB, or other base station associated with a second cell. The first cell may be, for example, a macrocell and the second cell may be a picocell or femtocell. Alternately, the first cell may be a picocell or femtocell and the second cell may be a macrocell. Alternately, the first and second cells may be macrocells or the first and second cells may be picocells or femtocells. The first signal may be, for example, a reference signal. The reference signal may be a common reference signal (CRS) and/or a channel state information reference signal (CSI-RS). Various embodiments may be in the form of a computer program product, communication device, apparatus, module, or other configuration.

Figure 25:
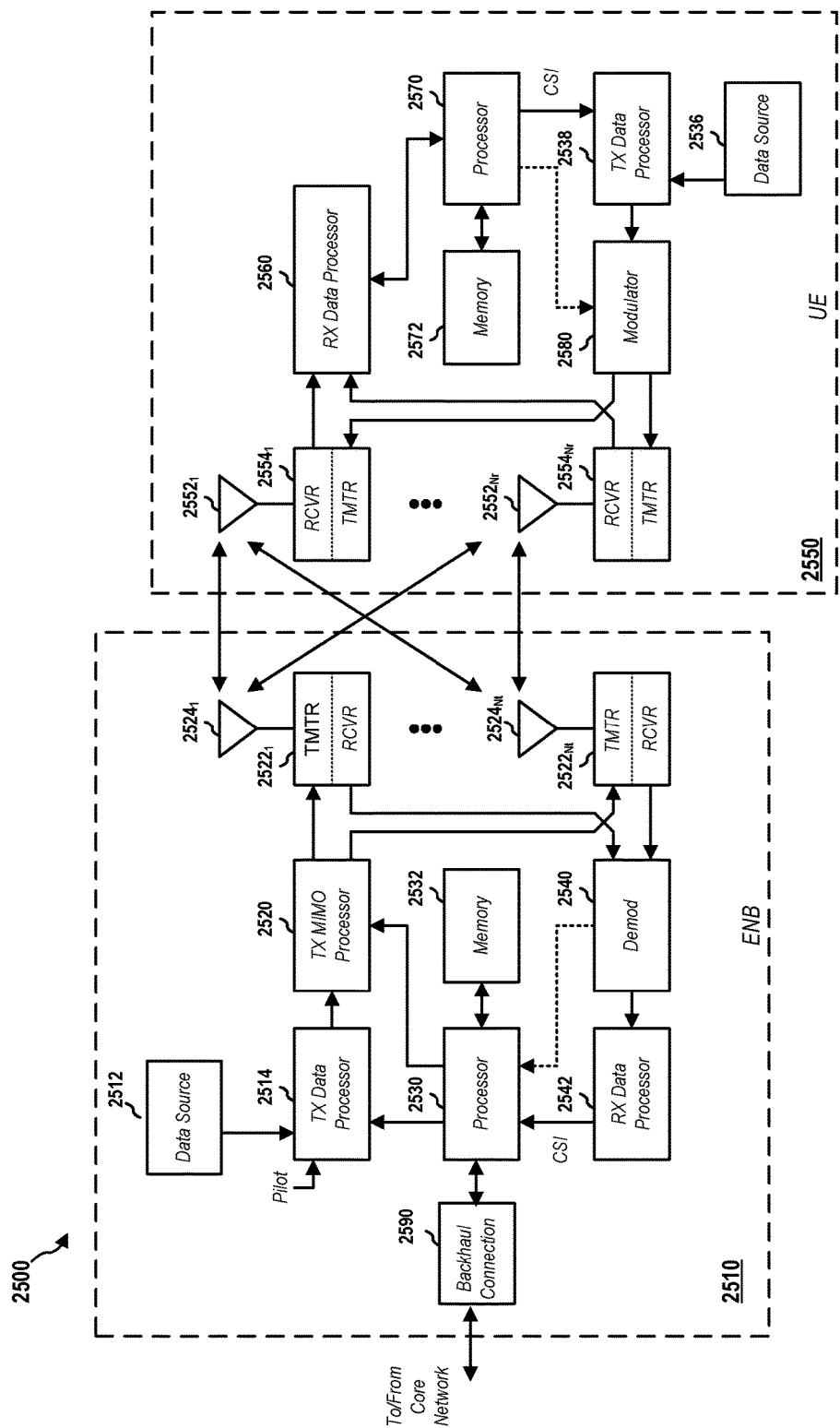
FIG. 25 illustrates an embodiment of a base station and UE in a wireless communications system.

FIG. 25 illustrates a block diagram of an embodiment of base station 2510 (i.e., an eNB or HeNB) and a terminal 2550 (i.e., a terminal, AT or UE) in an example LTE communication system 2500. These systems may correspond to those shown in FIGS. 1-4, and may be configured to implement the processes illustrated previously herein in FIGS. 18-24.

Various functions may be performed in the processors and memories as shown in base station 2510 (and/or in other components not shown), such as determination of subframe partition allocations and configuration, output transmit control to provide transmission during semi-static and/or dynamically allocated subframes, as well as other functions as described previously herein. UE 2550 may include one or more modules to receive signals from base station 2510 to determine channel characteristics, such as during semi-static subframes noticed to the UE, such as channel performing estimates, demodulate received data and generate spatial information, determine power level information, and/or other information associated with base station 2510 or other base stations (not shown).

In one embodiment, base station 2510 may adjust output transmissions in response to information received from UE 2550 or from backhaul signaling from another base station or a core network (not shown in FIG. 25) as described previously herein. This may be done in one or more components (or other components not shown) of base station 2510, such as processors 2514, 2530 and memory 2532. Base station 2510 may also include a transmit module including one or more components (or other components not shown) of eNB 2510, such as transmit modules 2524. Base station 2510 may include an interference cancellation module including one or more components (or other components not shown), such as processors 2530, 2542, demodulator module 2540, and memory 2532 to provide interference cancellation functionality. Base station 2510 may include a subframe partition coordination module including one or more components (or other components not shown), such as processors 2530, 2514 and memory 2532 to perform subframe partition functions as described previously herein and/or manage the transmitter module based on the subframe partition information. Base station 2510 may also include a control module for controlling receiver functionality. Base station 2510 may include a network connection module 2590 to provide networking with other systems, such as backhaul systems in the core network or other components as shown in FIGS. 2 and 3.

Likewise, UE 2550 may include a receive module including one or more components of UE 2550 (or other components not shown), such as receivers 2554. UE 2550 may also include a signal information module including one or more components (or other components not shown) of UE 2550, such as processors 2560 and 2570, and memory 2572. In one embodiment, one or more signals received at UE 2550 are processed to estimate channel characteristics, power information, spatial information and/or other information regarding eNBs, such as base station 2510 and/or other base stations (not shown). Measurements may be performed during semi-static subframes that are noticed to UE 2550 by base station 2510. Memories 2532 and 2572 may be used to store computer code for execution on one or more processors, such as processors 2560, 2570 and 2538, to implement processes associated with channel measurement and information, power level and/or spatial information determination, cell ID selection, inter-cell coordination, interference cancellation control, as well as other functions related to subframe allocation, interlacing, and associated transmission and reception as are described herein.

In operation, at the base station 2510, traffic data for a number of data streams may be provided from a data source 2512 to a transmit (TX) data processor 2514, where it may be processed and transmitted to one or more UEs 2550. The transmitted data may be controlled as described previously herein so as to provide interlaced subframe transmissions and/or perform associated signal measurements at one or more UEs 2550.

In one aspect, each data stream is processed and transmitted over a respective transmitter sub-system (shown as transmitters $2524_1$-$2524_{Nt}$) of base station 2510. TX data processor 2514 receives, formats, codes, and interleaves the traffic data for each data stream based on a particular coding scheme selected for that data stream so as to provide coded data. In particular, base station 2510 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 2514 as shown in FIG. 25 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 2530 based on instructions stored in memory 2532, or in other memory or instruction storage media of UE 2550 (not shown).

The modulation symbols for all data streams may then be provided to a TX MIMO processor 2520, which may further process the modulation symbols (e.g., for OFDM implementation). TX MIMO processor 2520 may then provide Nt modulation symbol streams to $N_t$ transmitters (TMTR) $2522_1$ through $2522_{Nt}$. The various symbols may be mapped to associated RBs for transmission.

TX MIMO processor 2530 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 ... $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as $B1 \times 1 + B2 \times 2 + BN_s \times N_s$, where $N_s$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $2522_1$ through $2522_{Nt}$ receives and processes a respective symbol stream to provide one or more analog signals, and further conditions (e.g., amplifies, filters, and upconverts) the analog signals to provide a modulated signal suitable for transmission over the MIMO channel $N_t$ modulated signals from transmitters $2522_1$ through $2522_{Nt}$ are then transmitted from $N_t$ antennas $2524_1$ through $2524_{Nt}$, respectively.

At UE 2550, the transmitted modulated signals are received by $N_r$ antennas $2552_1$ through $2552_{Nr}$ and the received signal from each antenna 2552 is provided to a respective receiver (RCVR) $2554_1$ through $2552_{Nr}$. Each receiver 2554 conditions (e.g., filters, amplifies and downconverts) a respective received signal, digitizes the conditioned signal to provide samples, and further processes the samples to provide a corresponding "received" symbol stream.

An RX data processor 2560 then receives and processes the $N_r$ received symbol streams from $N_r$ receivers $2554_1$ through $2552_{Nr}$ based on a particular receiver processing technique so as to provide $N_s$ "detected" symbol streams so at to provide estimates of the $N_s$ transmitted symbol streams. The RX data processor 2560 then demodulates, deinterleaves, and decodes each detected symbol stream to recover the traffic data for the data stream. The processing by RX data processor 2560 is typically complementary to that performed by TX MIMO processor 2520 and TX data processor 2514 in base station 2510.

A processor 2570 may periodically determine a precoding matrix for use as is described further below. Processor 2570 may then formulate a reverse link message that may include a matrix index portion and a rank value portion. In various aspects, the reverse link message may include various types of information regarding the communication link and/or the received data stream. The reverse link message may then be processed by a TX data processor 2538, which may also receive traffic data for a number of data streams from a data source 2536 which may then be modulated by a modulator 2580, conditioned by transmitters $2554_1$ through $2554_{Nr}$, and transmitted back to base station 2510. Information transmitted back to base station 2510 may include power level and/or spatial information for providing beamforming to mitigate interference from base station 2510.

At base station 2510, the modulated signals from UE 2550 are received by antennas 2524, conditioned by receivers 2522, demodulated by a demodulator 2540, and processed by a RX data processor 2542 to extract the message transmitted by UE 2550. Processor 2530 then determines which pre-coding matrix to use for determining beamforming weights, and then processes the extracted message.

In some configurations, the apparatus for wireless communication includes means for performing various functions as described herein. In one aspect, the aforementioned means may be a processor or processors and associated memory in which embodiments reside, such as are shown in FIG. 25, and which are configured to perform the functions recited by the aforementioned means. The may be, for example, modules or apparatus residing in UEs, eNBs or other network nodes such as are shown in FIGS. 1-4 and 6-8 to perform the subframe partition-related functions described herein. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

What is claimed is:

1. A method for wireless communications, comprising:
   receiving information relating to a subframe resource interlace allocation of a first downlink (DL) resource from a first base station;

receiving signaling from the first base station during at least one subframe associated with the subframe resource interlace allocation;

determining a signal metric associated with the signaling, wherein the first DL resource is time-division orthogonal to a second DL resource allocated to a second base station; and transmitting the signal metric to the first base station;

wherein a base station type of the first base station is one of a first power class macrocell base station, a second power class macrocell base station, a femtocell base station, or a picocell base station, and the base station type of the first base station is different from a base station type of the second base station.

2. The method of claim 1, wherein the signal metric is a Radio Link Monitoring (RLM) metric, and the method further comprises determining whether to declare Radio Link Failure (RLF) based on the signal metric.

3. The method of claim 1, wherein the information further includes Radio Resource Management (RRM) control information.

4. The method of claim 1, wherein the information further includes channel feedback information.

5. The method of claim 1, wherein the information further includes channel quality indication (CQI) information.

6. The method of claim 1, wherein the first base station is associated with a macrocell and the second base station is associated with a picocell or femtocell.

7. The method of claim 1, wherein the first base station is associated with a picocell or femtocell and the second base station is associated with a macrocell.

8. The method of claim 1, wherein the signaling comprises a reference signal.

9. The method of claim 1, wherein the subframe resource interlace allocation is a semi-static resource allocation.

10. The method of claim 1, further comprising:
storing the subframe resource interlace allocation, wherein the subframe resource interlace allocation is configured as one of a semi-static resource or dynamic resource.

11. A non-transitory computer-readable medium including code for causing one or more computers to:
receive information relating to a subframe resource interlace allocation of a first downlink (DL) resource from a first base station;
receive signaling from the first base station during at least one subframe associated with the subframe resource interlace allocation;
determine a signal metric associated with the signaling, wherein the first DL resource is time-division orthogonal to a second DL resource allocated to a second base station; and
transmit the signal metric to the first base station;
wherein a base station type of the first base station is one of a first rower class macrocell base station, a second power class macrocell base station, a femtocell base station, or a picocell base station, and the base station type of the first base station is different from a base station type of the second base station.

12. The non-transitory computer-readable medium of claim 11, wherein the signal metric is a Radio Link Monitoring (RLM) metric, and the non-transitory computer-readable medium further includes code for causing the one or more computers to determine whether to declare Radio Link Failure (RLF) based on the signal metric.

13. The non-transitory computer-readable medium of claim 11, wherein the information includes one or more of channel feedback information, channel quality indication (CQI) information, and Radio Resource Management (RRM) control information.

14. The non-transitory computer-readable medium of claim 11, wherein the signaling comprises a reference signal.

15. The non-transitory computer-readable medium of claim 11, further including code for causing the one or more computers to:
store the subframe resource interlace allocation, wherein the subframe resource interlace allocation is configured as one of a semi-static resource or dynamic resource.

16. A wireless communications device, comprising:
a memory;
at least one processor coupled to the memory; and
instructions stored in the memory and operable, when executed by the at least one processor, to cause the wireless communications device to:
receive information relating to a subframe resource interlace allocation of a first downlink (DL) resource from a first base station;
receive signaling from the first base station during at least one subframe associated with the subframe resource interlace allocation;
determine a signal metric associated with the signaling, wherein the first DL resource is time-division orthogonal to a second DL resource allocated to a second base station; and
transmit the signal metric to the first base station;
wherein a base station type of the first base station is one of a first power class macrocell base station, a second power class macrocell base station, a femtocells base station, or a picocell base station, and the base station type of the first base station is different from a base station type of the second base station.

17. The wireless communications device of claim 16, wherein the signal metric is a Radio Link Monitoring (RLM) metric, and the at least one processor is further configured to determine whether to declare Radio Link Failure (RLF) based on the signal metric.

18. The wireless communications device of claim 16, wherein the information includes one or more of channel feedback information, channel quality indication (CQI) information, and Radio Resource Management (RRM) control information.

19. The wireless communications device at claim 16, wherein the signaling comprises a reference signal.

20. The wireless communications device of claim 16, wherein the instructions operable to cause the wireless communications device to:
store the subframe resource interlace allocation, wherein the subframe resource interlace allocation is configured as one of a semi-static resource or dynamic resource.

21. A wireless communications device, comprising:
means for receiving information relating to a subframe resource interlace allocation of a first downlink (DL) resource from a first base station;
means for receiving signaling from the first base station during at least one subframe associated with the subframe resource interlace allocation;
means for determining a signal metric associated with the signaling, wherein the first DL resource is time-division orthogonal to a second DL resource allocated to a second base station; and
means for transmitting the signal metric to the first base station;
wherein a base station type of the first base station is one of a first power class macrocell base station, a second power class macrocell base station, a femtocell base station, or a picocell base station, and the base station type of the first base station is different front a base station type of the second base station.

22. The wireless communications device of claim 21, wherein the signal metric is a Radio Link Monitoring (RLM) metric, and the wireless communications device further comprises means for determining whether to declare Radio Link Failure (RLF) based on the signal metric.

23. The wireless communications device of claim 21 wherein the information further includes Radio Resource Management (RRM) control information.

\* \* \* \* \*